US012579582B2

(12) United States Patent
Falandino et al.

(10) Patent No.: US 12,579,582 B2
(45) Date of Patent: Mar. 17, 2026

(54) SYSTEM AND METHOD FOR PROCESSING DOCUMENT DATA

(71) Applicant: Insurance Quantified, LLC, Dover, DE (US)

(72) Inventors: Loren Naim Falandino, Superior Township, MI (US); Thomas Allen Seward, Ann Arbor, MI (US); Bradley Keith Goodyear, Superior Township, MI (US)

(73) Assignee: Insurance Quantified, LLC, Dover, DE (US)

( * ) Notice: Subject to any disclaimer, the term of this patent is extended or adjusted under 35 U.S.C. 154(b) by 0 days.

(21) Appl. No.: 18/505,704

(22) Filed: Nov. 9, 2023

(65) Prior Publication Data

US 2024/0161203 A1 May 16, 2024

Related U.S. Application Data

(60) Provisional application No. 63/424,454, filed on Nov. 10, 2022.

(51) Int. Cl.
*G06Q 40/08* (2012.01)
*G06Q 10/0631* (2023.01)
(52) U.S. Cl.
CPC ....... *G06Q 40/08* (2013.01); *G06Q 10/06311* (2013.01)
(58) Field of Classification Search
CPC .......................... G06Q 40/08; G06Q 10/06311
USPC ............................................................. 705/4
See application file for complete search history.

(56) References Cited

U.S. PATENT DOCUMENTS

| | | | |
|---|---|---|---|
| 8,175,394 B2 | 5/2012 | Vincent | |
| 11,210,473 B1 | 12/2021 | Mariko et al. | |
| 11,676,204 B1 * | 6/2023 | Fleming ................ | G06Q 40/04 |
| | | | 705/37 |
| 2002/0035488 A1 * | 3/2002 | Aquila ................... | G06Q 40/02 |
| | | | 705/4 |
| 2003/0036934 A1 * | 2/2003 | Ouchi ............. | G06Q 10/06316 |
| | | | 705/7.13 |

(Continued)

FOREIGN PATENT DOCUMENTS

| | | | | |
|---|---|---|---|---|
| CN | 106600423 A * | 4/2017 | ............ | G06Q 40/08 |
| WO | WO 2005/050545 A1 | 6/2005 | | |

OTHER PUBLICATIONS

U.S. Appl. No. 18/505,729, filed Nov. 9, 2023, Falandino et al.

(Continued)

*Primary Examiner* — Robert R Niquette
(74) *Attorney, Agent, or Firm* — Wolf, Greenfield & Sacks, P.C.

(57) ABSTRACT

Techniques including a system and method for processing insurance documents are provided. The techniques may involve the use of a system. The system may include a component configured to process a plurality of input document entities. The system may include a routing component configured to process the plurality of input document entities, wherein the routing component is configured to determine one or more workflows for processing at least one of the plurality of document entities. The system may include a workflow management component configured to process the at least one of the plurality of document entities.

13 Claims, 25 Drawing Sheets

(56) References Cited

U.S. PATENT DOCUMENTS

| | | | |
|---|---|---|---|
| 2004/0128182 A1* | 7/2004 | Pepoon | G06Q 10/10 |
| | | | 705/4 |
| 2005/0149376 A1* | 7/2005 | Guyan | G06Q 40/08 |
| | | | 705/7.15 |
| 2009/0043615 A1 | 2/2009 | Belhe et al. | |
| 2009/0187429 A1 | 7/2009 | Scalet et al. | |
| 2013/0039571 A1 | 2/2013 | Stein et al. | |
| 2014/0324466 A1 | 10/2014 | Wertzberger | |
| 2016/0012544 A1 | 1/2016 | Ramaswamy et al. | |
| 2016/0307200 A1* | 10/2016 | Adams | G06Q 30/0202 |
| 2016/0342852 A1 | 11/2016 | Blanchflower | |
| 2021/0383067 A1 | 12/2021 | Reisswig | |
| 2022/0017032 A1 | 1/2022 | Qi et al. | |
| 2022/0214911 A1* | 7/2022 | Scarfutti | G06F 16/245 |
| 2022/0392047 A1 | 12/2022 | Wheaton et al. | |
| 2024/0086734 A1 | 3/2024 | Singh et al. | |
| 2024/0161204 A1 | 5/2024 | Bien | |
| 2024/0161530 A1 | 5/2024 | Falandino et al. | |

OTHER PUBLICATIONS

U.S. Appl. No. 18/505,759, filed Nov. 9, 2023, Falandino et al.

U.S. Appl. No. 18/479,635, filed Oct. 2, 2023, Shah et al.

Shah et al., Machine Learning-Based Techniques for Digital Data Extraction from Documents with Complex Formats. U.S. Appl. No. 18/479,635, filed Oct. 2, 2023.

Carion et al., End-to-End object detection with transformers. European Conference on computer vision. Cham: Springer International Publishing. 2020. 26 Pages.

Xu et al., Layoutlmv2: Multi-modal pre-training for visually-rich document understanding. arXiv preprint arXiv:2012.14740. 2022. 13 pages.

Lopresti et al., Using Consensus Sequence Voting to Correct OCR Errors. Computer Vision and Image Understanding. Jan. 3, 1996;67(1):39-47.

\* cited by examiner

Process
*200*

*201* Begin

*202* Import Data Items (Documents, Messages, Data Inputs, Etc.)

*203* Perform Ingest Processing and Classification

*204* Automated Routing and Annotation

*205* Generate Human - in - the - Loop Annotation and Quality Assurance Tasks

*206* Post-Processing and Enrichment

*207* Output Results (Scoring, Reports, Dashboards, Third -Party System Outputs

*208* End

| FIG. 7A |
|---|
| FIG. 7B |

| *FIG. 8A* |
|-----------|
| *FIG. 8B* |

FIG. 9B

| *FIG. 10A* | *FIG. 10B* |

| FIG. 14A | FIG. 14B | FIG. 14C | FIG. 14D | FIG.141E | FIG. 14F |

SYSTEM AND METHOD FOR PROCESSING DOCUMENT DATA

RELATED APPLICATIONS

This application is a Non-Provisional of Provisional (35 USC 119(e)) of U.S. Application Ser. No. 63/424,454, filed Nov. 10, 2022, entitled "SYSTEM AND METHOD FOR PROCESSING DOCUMENT DATA", which is incorporated by reference herein in its entirety.

BACKGROUND

There are many systems that exist for processing business information. Unfortunately, information is often stored in disparate systems, and in various formats. Additionally, there is often a human element required for reviewing and implementing actions based on business information. Many of these documents contain complex information that needs to be reviewed by experienced personnel to correctly determine and correct issues, and/or perform other tasks related to the documents. For example, in the insurance industry, certain issues need to be evaluated such as business risk, exposure to claims, and other aspects of business operation. Rapidly and accurately extracting the information necessary for understanding these issues is a formidable task that generally cannot be done quickly or efficiently.

SUMMARY

The inventors have recognized and appreciated that conventional systems are unable to meet the real-world needs of users. For example, it is not practical for large businesses, e.g., large insurance carriers, to review and process all received documents, which may include thousands, hundreds of thousands, or up to millions of documents, by hand for purposes of analysis, modeling and data management.

In some embodiments described herein, a system is provided that permits multiple data sources to be operated on more efficiently, and for data processing workflows involving such information be performed more expediently and accurately. In some instances, the system may involve humans in the workflow to resolve issues regarding data and to learn and operate more efficiently over time. To this end, one of more machine learning models may be employed to learn different aspects of documents that contain business information.

In some embodiments, a customized data processing platform is provided, that permits extraction, annotation, and transformation of large volumes of complex data elements from documents using a combination of automation and human tasks. An orchestration system drives the entire process, routing documents or portions of documents to a variety of workflows based on classification that occurs throughout the process. In some aspects, individual tasks are broken up granularly to support processing portions of a single document in parallel whenever possible. Triggering of tasks can occur based on a variety of properties, such as, for example, quality metrics, random sampling, or other logical data checks. In some implementations, such documents may relate to the commercial insurance industry, and such documents may be processed by the system to determine one or more measurable parameters in relation to risk, financial exposure, or other measured parameters.

In some implementations, this system may use numerous automation strategies as well as proprietary tools designed for humans to facilitate the correct annotation of components and data elements. This applies to numerous document types, including loss run, exposure, applications, questionnaires, emails, clearance, standardized forms, structured forms, urgency and triage related forms, broker specifications, entities (e.g., ACCORD), carrier supplementals, and other document types specialized to the commercial insurance industry. Documents are presented in a wide variety of formats, including PDF, DOC, DOCX, TXT, CSV, PNG, JPEG, XLS, XLSX, XLC, JSON, and MSG among other text, document, message, image, and spreadsheet formats, among others.

It is appreciated that according to some embodiments as defined herein, some documents processed by this system may be unique instances of a presentation that has not been encountered before. Certain aspects of this system are what enables the processing of these new instances accurately. As these new cases are identified and the distribution of documents and presentations received changes, the system can be modified and extended in real time, allowing for new automations, human tools, quality checks, data transformations, and workflows to be deployed over time. In some embodiments, human-in-the-loop processing functions are provided as needed to ensure quality of the processing for particular tasks, to provide quality and assurances on the data, as well as reduce the number of human interactions.

In some aspects, it is appreciated that to provide accurate results, the input information must be determined as accurate as well, and it is realized that the initial quality of documents received from customers has a wide range of quality. In particular, individual Optical Character Recognition (OCR) products can produce poor results in some cases based on the quality of the originating documents. While there are limits on OCR technology such that documents below a certain threshold cannot produce good results, this is a small number relative to the total number of documents processed. What is more common for documents with quality issues is that they will be of middling quality, and individual OCR products will make transcription errors that can be hard to detect, even taking into consideration confidence scores.

To resolve this issue, methods and systems are provided that permit use multiple OCR engines in concert, resolving the results into a single unified view that boosts the overall precision and recall of the results. It is appreciated that this approach is fast, memory efficient and fault tolerant. In some implementations, interval trees are used to build clusters of entities (e.g., words) based on positional characteristics. These trees are then joined into a graph of entities and resolved using connected components analysis. In some implementations, the distance between words within cluster groups is taken into consideration, using three OCR sources to establish consensus when transcription errors occur. For example, the Levenshtein distance may be used (which is a measure of the minimum number of single character edits (i.e., insertions, deletions, or substitutions) required to change one word into the other. The final result is used as the basis for downstream processing, guaranteeing that OCR errors and missed words are minimized as much as possible.

In the commercial insurance industry, it is appreciated that loss history is a crucial component of new business submissions as it helps inform the level of risk a potential insured represents. A complete loss history comprises both closed claims, where the final severity of the loss is clear, and open claims where the final total paid is unknown. To estimate the remaining loss development of open claims, underwriters must trust the reserves set by the current or prior insurers or other estimations to understand their severity. Since reserving practices vary by carrier, and are often inaccurate, any open claims add a degree of uncertainty to the overall level of risk associated with the prospective client. Understanding how an open claim will likely develop, and by extension how accurate the current reserves are, is thus an important factor in assessing overall risk.

To address this problem, systems and methods described herein may implement a predictive model that examines properties of open claims and predicts the ratio of total paid (future closed state) to total incurred (current open state). That is, the model may be configured to predict a relative expected under or over-reserving for a particular open claim. In some implementations, the system may be trained using an extensive contributory data set using existing data relating to open and closed claims (e.g., six-figure data set identifying open and closed claims) across the most common coverage types. The model, in some embodiments, may implement many features (e.g., over 100 features) and may relate to such feature types as loss description, line of business, and financial values.

Using such training data, complementary models may be developed for claims where only the open or closed state is known. At first, it would seem that a system would necessarily need to see both states (linked claims), because the system is modeling the relationship between open and closed states. However, it is appreciated that a closed claims model is able to predict the total paid as a function of those features which are mostly invariant—features that typically do not change much over time. For example, a system can relate the loss description and coverage type of claims to the expected total paid for a particular claim. In the case of open claims, the system may predict the total incurred (e.g., paid+reserves) and the system can use additional features, including ones that change over time, like claim age. While it is true that in the case of open claims, the system can only predict total incurred—a target which, by the problem definition, is known to exhibit various biases, machine learning properties work in favor by allowing the model to generalize in a way such that these biases "wash out" by learning across insurance carriers. Further, the outputs of these models serve as upstream features to the ultimate downstream model in an approach called "model stacking." Which corrects for most remaining biases, given sufficient data. This model has been shown to be accurate when predicting the reserve score on historical open claims.

The systems and techniques described herein provide advantages over traditional techniques used for analyzing and processing insurance documents and data. Insurance documents typically contain data and information which cannot be accurately identified and processed by automated processes due to the complexity of the data, organization of the data, structure of the data, quality of the documents, and organization of the documents, among other factors. Because of the aforementioned factors, traditional methods for analyzing and processing insurance documents and data relied on human tasks for data extraction from insurance documents. These traditional techniques are inefficient and do not allow for extensive processing of newly received insurance documents because of the need for human tasks to complete data extraction.

The technology as described herein provide benefits over the traditional techniques of analyzing and processing insurance information because these techniques allow insurance document processing system to process and analyze documents faster and allow for more advanced processing to be performed on insurance document data. The ingestion and extraction pipelines and processes, according to embodiments of the technology described herein, allow data to be efficiently and effectively extracted from a variety of insurance documents. These pipelines and processes may include multi engine optical character recognition processes, which allow the data contained within different formats and types of documents to be recognized. These pipelines and processes may, additionally or alternatively, include workflow orchestrations including document categorization, spatial or structural labeling, and/or language model based labeling, which allow for insurance document specific analyses to be performed on the data of the documents. The workflows additionally allow for faster processing of documents by analysis systems because the extracted data is automatically formatted and prepared for analysis in a consistent manner, whereas traditional techniques requiring human tasks do not provide such formatting of data for insurance claim specific analysis. The technology described herein additionally, in some embodiments, may involve the automated generation of human-in-the-loop tasks, which provides improvement over traditional systems, allowing for faster processing of insurance claims documents, by reducing the need for human analysis of all documents and by ensuring any human-in-the-loop tasks are specific to requirements of a particular document. This reduces the time required to complete processing of documents and allows for a greater number of documents to be processed. By allowing for the expedited processing of documents, a greater number of documents may be processed, which may allow for the training of machine learning models which can predict one or more aspects of an insurance claim on larger datasets. The machine learning models described herein allow for estimations to be made about one or more aspects of insurance claims, which improves the information available about and accuracy of insurance loss estimations and risks associated with particular insurance claims.

According to one aspect, a system is provided. The system comprises a component configured to process a plurality of input document entities, a routing component configured to process the plurality of input document entities, wherein the routing component is configured to determine one or more workflows for processing at least one of the plurality of document entities, and a workflow management component configured to process the at least one of the plurality of document entities.

According to one embodiment, the system further comprises a component configured to generate one or more human-in-the-loop tasks for processing at least a portion of the at least one of the plurality of document entities.

According to one embodiment, at least one of the one or more human-in-the-loop tasks includes a quality assurance annotation performed by at least one user.

According to one embodiment, the routing component is configured to route input documents or portions of input documents to one or more workflows. According to one embodiment, the routing component is configured to route the input documents or portions of input documents to one or more workflows based on a classification of the input documents or portions of input documents. According to one embodiment, the routing component is configured to route the input documents or portions of input documents to a specific user to perform a reviewing action.

According to one embodiment, the system further comprises a plurality of machine learning models configured to process the plurality of input document entities, wherein the plurality of input document entities comprises input documents or portions of input documents.

According to one embodiment, the routing component is configured to create one or more tasks that process the input documents or portions of input documents. According to one embodiment, the system further comprises a component configured to create a plurality of parallel tasks to support processing of a single document.

According to one embodiment, the system further comprises a component that is configured to trigger tasks based on at least one of a group comprising quality metrics, random sampling, logical data check, and other properties of a subject input document or portion of the subject input document.

According to one embodiment, the system further comprises a component configured to trigger one or more human-in-the-loop processing tasks including annotations of data elements.

According to one embodiment, the system further comprises at least one component configured to determine one or more outputs determined based on processing of the plurality of input document entities that comprise input documents or portions of input documents. According to one embodiment, one or more outputs include at least one of a group comprising risk measure in relation to a claim, a prediction of loss value in relation to the claim; and a scoring parameter in relation to the claim.

According to one embodiment, the system further comprises at least one machine learning model configured to predict loss in relation to a subject insurance claim. According to one embodiment, the system further comprises at least one machine learning model configured to predict loss in relation to the subject insurance claim based on closed claims data. According to one embodiment, the system further comprises at least one machine learning model configured to predict loss in relation to the subject insurance claim based on open claims data. According to one embodiment, at least one machine learning model configured to predict loss in relation to a subject insurance claim is configured to train on a training data set defined across insurance carriers in a commercial insurance industry.

According to one aspect, a method for processing a plurality of document entities is provided. The method comprises using at last one computer hardware processor to perform analyzing a plurality of entities of an input document, based on the analyzing, determining one or more workflows, each workflow comprising a plurality of tasks for processing at least one of the plurality of entities, and performing the plurality of tasks of each of the one or more workflows.

According to one embodiment, performing the plurality of tasks comprises determining whether one or more human-in-the-loop tasks are to be performed, in response to determining one or more human-in-the-loop tasks are to be performed, generating the one or more human-in-the-loop tasks, and providing the one or more human-in-the-loop tasks to at least one user.

According to one aspect at least one non-transitory computer-readable storage medium storing processor-executable instructions is provided that, when executed by at least one computer hardware processor, causes the at least one computer hardware processor to perform a method comprising: analyzing a plurality of entities of an input document, based on the analyzing, determining one or more workflows, each workflow comprising a plurality of tasks for processing at least one of the plurality of entities, and performing the plurality of tasks of each of the one or more workflows.

According to one aspect a system is provided. The system comprises a plurality of optical character recognition engines configured to process, in parallel, at least one document or portion thereof, and produce output results for each of the optical character recognition engines, and a component adapted to combine the output results of each of the optical character recognition engines and produce a single unified view of the at least one document or portion thereof.

According to one embodiment, the component adapted to combine the output results of each of the optical character recognition engines further comprises a component adapted to produce, from the output results of each of the optical character recognition engines, a respective interval tree for each of the respective output results of each of the optical character recognition engines. According to one embodiment, each respective interval tree comprises a cluster of word entities identified within the at least one document or portion thereof, and wherein each respective interval tree is arranged based on positional characteristics of the word entities identified within the at least one document or portion thereof. According to one embodiment, the component adapted to combine the output results of each of the optical character recognition engines further comprises a component adapted to join the respective interval trees into a graph of entities using a connected component analysis.

According to one embodiment, the plurality of optical character recognition engines includes at least three optical character recognition engines, and wherein the component adapted to combine the output results of each of the optical character recognition engines further comprises a component adapted to resolve consensus between the output results of each of the optical character recognition engines.

According to one embodiment, the component adapted to resolve consensus between the output results of each of the optical character recognition engines determines consensus at least in part based on a distance between words within cluster group. According to one embodiment, the distance between words within a cluster group is determined based on a determination of a Levenshtein distance. According to one embodiment, the system further comprises an output component configured to output the single unified view of the at least one document or portion thereof.

According to one aspect a method is provided. The method comprises using at last one computer hardware processor to perform processing, using a plurality of optical character recognition engines in parallel, at least one document or portion thereof, and combining output results of each of the optical character recognition engines to produce a single unified view of the at least one document or portion thereof.

According to one embodiment, the method further comprises producing, from the output results of each of the optical character recognition engines, a respective interval tree for each of the respective output results of each of the optical character recognition engines. According to one embodiment, a respective interval tree for each of the respective output results of each of the optical character recognition engines comprises identifying a cluster of word entities within the at least one document or portion thereof for the respective interval tree, and arranging the respective interval tree based on positional characteristics of the word entities identified within the at least one document or portion thereof. According to one embodiment, the method further comprises joining the respective interval trees into a graph of entities using a connected component analysis.

According to one embodiment, the plurality of optical character recognition engines includes at least three optical character recognition engines, and wherein combining the output results of each of the optical character recognition engines comprises resolving consensus between the output results of each of the optical character recognition engines.

According to one embodiment, resolving consensus between the output results of each of the optical character recognition engines comprises determining consensus at least in part based on a distance between words within cluster group. According to one embodiment, determining consensus at least in part based on a distance between words within cluster group comprises: determining a Levenshtein distance between words within a cluster group; and determining the distance between words within the cluster group based on the Levenshtein distance. According to one embodiment, the method further comprises outputting the single unified view of the at least one document or portion thereof.

According to one aspect at least one non-transitory computer-readable storage medium storing processor-executable instructions is provided that, when executed by at least one computer hardware processor, causes the at least one computer hardware processor to perform a method comprising: processing, using a plurality of optical character recognition engines in parallel, at least one document or portion thereof, and combining output results of each of the optical character recognition engines to produce a single unified view of the at least one document or portion thereof.

According to one embodiment, the method further comprises producing, from the output results of each of the optical character recognition engines, a respective interval tree for each of the respective output results of each of the optical character recognition engines.

According to one embodiment, producing a respective interval tree for each of the respective output results of each of the optical character recognition engines comprises identifying a cluster of word entities within the at least one document or portion thereof for the respective interval tree, and arranging the respective interval tree based on positional characteristics of the word entities identified within the at least one document or portion thereof.

According to one embodiment, the plurality of optical character recognition engines includes at least three optical character recognition engines, and wherein combining the output results of each of the optical character recognition engines comprises resolving consensus between the output results of each of the optical character recognition engines.

According to one aspect a system is provided. The system comprises a plurality of machine learning models trained on a plurality of insurance loss claim records, the plurality of machine learning models comprising at least one machine learning model trained on open claims records, and at least one machine learning model trained on closed claims records, and a component configured to predict a loss for a subject insurance claim based on outputs of the at least one machine learning model trained on open claims records and the at least one machine learning model trained on closed claims records.

According to one embodiment, at least one of the plurality of machine learning models is configured to predict loss in relation to the subject insurance claim.

According to one embodiment, at least one machine learning model trained on closed claims records is configured to analyze features of the subject insurance claim including a loss description, a coverage type of the subject insurance claim, and a line of business, and is configured to predict loss in relation to the subject insurance claim based on closed claims data and the features of the subject insurance claim. According to one embodiment, at least one machine learning model trained on open claims records is configured to analyze features of the subject insurance claim including a coverage type, a loss type, a loss description, litigation statuses, associated dates, a line of business, and financial values, and is configured to predict loss in relation to the subject insurance claim based on open claims data and the features of the subject insurance claim. According to one embodiment, at least one machine learning model configured to predict loss in relation to the subject insurance claim is configured to train on a training data set defined across insurance carriers in a commercial insurance industry.

According to one embodiment, the subject insurance claim is currently open, and wherein the component configured to predict the loss for the subject insurance claim in relation to outputs of the at least one machine learning model trained on open claims records and the at least one machine learning model trained on closed claims records, is configured to predict a ratio of a total paid of a future closed state of the subject insurance claim to a total currently incurred for the subject insurance claim.

According to one embodiment, the system further comprises a component configured to determine, for the currently open subject insurance claim, whether estimated reserves for the currently open subject insurance claim are under-reserved or over-reserved.

According to one embodiment, wherein the plurality of machine learning models are trained on a plurality of insurance loss claim records feature types including loss description, line of business, and financial values.

According to one embodiment, the system further comprises a component configured to select a machine learning model for claims records responsive to the subject insurance claim where only an open or closed state is known.

According to one embodiment, the component configured to predict the loss for the subject insurance claim based on outputs of the at least one machine learning model trained on open claims records and the at least one machine learning model trained on closed claims records, is configured to predict the total paid of the future closed state of the subject insurance claim.

According to one embodiment, the system further comprises a component configured to process a plurality of input document entities relating to insurance risk, a routing component configured to process the plurality of input document entities, wherein the routing component is configured to determine one or more workflows for processing at least one of the plurality of document entities, a workflow management component configured to process the at least one of the plurality of document entities, and at least one component configured to determine one or more outputs determined based on processing of the plurality of input document entities that comprise input documents or portions of input documents, and a component configured to train the plurality of machine learning models based on the outputs determined based on processing of the plurality of input document entities that comprise input documents or portions of input documents.

According to one embodiment, the component configured to predict the loss for the subject insurance claim based on the outputs of the at least one machine learning model trained on open claims records and the at least one machine learning model trained on closed claims records comprises at least one machine learning model trained on linked claims records, configured to predict the loss for the subject insurance claim based on the outputs of the at least one machine learning model trained on open claims records and the at least one machine learning model trained on closed claims records, features of the subject insurance claim, and linked claims data.

According to one embodiment, the linked claims records comprise a plurality of linked insurance claims, wherein each linked insurance claim includes open state data associated with the linked insurance claim and closed state data associated with the linked insurance claim.

According to one aspect, a method is provided. The method comprises using at last one computer hardware processor to perform analyzing a subject insurance claim using a plurality of machine learning models trained on a plurality of insurance loss claim records, the plurality of machine learning models comprising, at least one machine learning model trained on open claims records, and at least one machine learning model trained on closed claims records, and predicting a loss for the subject insurance claim based on outputs of the at least one machine learning model trained on open claims records and the at least one machine learning model trained on closed claims records.

According to one embodiment, analyzing using the at least one machine learning model trained on closed claims records comprises analyzing features of the subject insurance claim including a loss description, a coverage type of the subject insurance claim, and a line of business, and predicting loss in relation to the subject insurance claim based on closed claims data and the features of the subject insurance claim. According to one embodiment, analyzing using the at least one machine learning model trained on open claims records comprises analyzing features of the subject insurance claim including a coverage type, a loss type, a loss description, litigation statuses, associated dates, a line of business, and financial values, and predicting loss in relation to the subject insurance claim based on open claims data and the features of the subject insurance claim.

According to one embodiment, predicting the loss for the subject insurance claim comprises predicting, using at least one machine learning model, trained on linked claims records, the loss for the subject insurance claim based on the outputs of the at least one machine learning model trained on open claims records and the at least one machine learning model trained on closed claims records, features of the subject insurance claim, and linked claims data.

According to one aspect at least one non-transitory computer-readable storage medium storing processor-executable instructions is provided that, when executed by at least one computer hardware processor, causes the at least one computer hardware processor to perform a method comprising: analyzing a subject insurance claim using a plurality of machine learning models trained on a plurality of insurance loss claim records, the plurality of machine learning models comprising at least one machine learning model trained on open claims records, and at least one machine learning model trained on closed claims records, and predicting a loss for the subject insurance claim based on outputs of the at least one machine learning model trained on open claims records and the at least one machine learning model trained on closed claims records.

According to one embodiment, the method further comprises analyzing using the at least one machine learning model trained on closed claims records comprises analyzing features of the subject insurance claim including a loss description, a coverage type of the subject insurance claim, and a line of business, and predicting loss in relation to the subject insurance claim based on closed claims data and the features of the subject insurance claim.

According to one embodiment, the method further comprises analyzing using the at least one machine learning model trained on open claims records comprises analyzing features of the subject insurance claim including a coverage type, a loss type, a loss description, litigation statuses, associated dates, a line of business, and financial values, and predicting loss in relation to the subject insurance claim based on open claims data and the features of the subject insurance claim.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed herein with reference to the accompanying figures, which are not intended to be drawn to scale. The figures are included to provide illustration and a further understanding of the various aspects and embodiments and are incorporated in and constitute a part of this specification but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 9B shows an example view of a user interface for selecting human-in-the-loop tasks; according to various embodiments;

DETAILED DESCRIPTION

Figure 1:
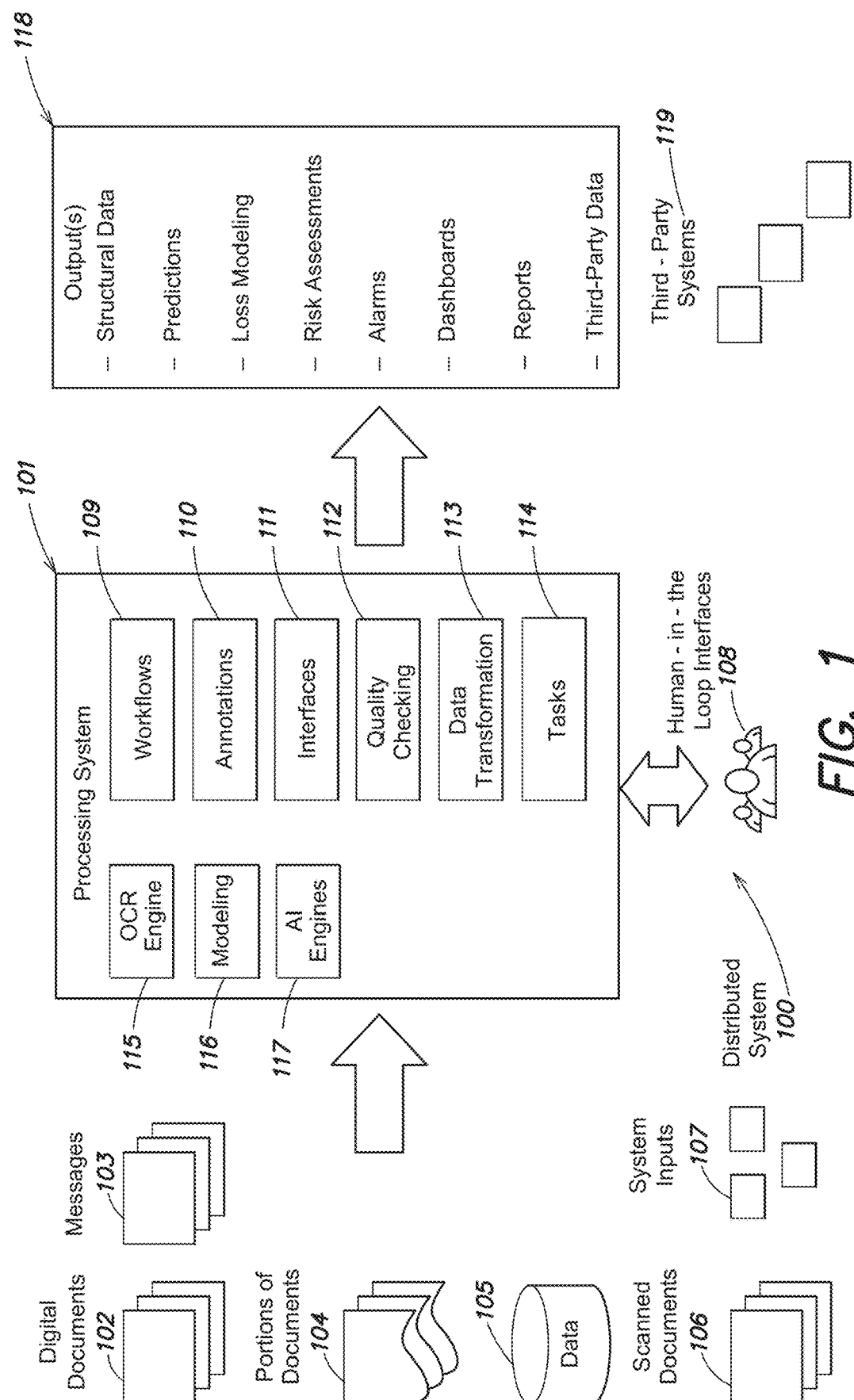
FIG. 1 shows a block diagram of a distributed computer system 100 capable of implementing various embodiments.

As discussed, systems and methods are provided herein that permit multiple data sources to be operated on more efficiently, and for data processing workflows involving such information to be performed more expediently and accurately. In some instances, the system may involve humans in the workflow to resolve issues regarding data, quality, and other issues and to learn and operate more efficiently over time. FIG. 1 shows a block diagram of a distributed computer system 100 capable of implementing various embodiments.

In particular, FIG. 1 includes a processing system 101 which includes one or more components. Processing system 101 receives digital documents 102, portions of documents

104, data 105, scanned documents 106, messages 103 and system inputs 107 and processes this information and produces one or more outputs (e.g., outputs 118). Documents, including digital documents 102, portions of documents 104, scanned documents 106, messages 103 and inputs 107, may have any suitable format, for example PDF, DOC, DOCX, TXT, CSV, PNG, JPEG, XLS, XLSX, XLC, JSON, and MSG among other text, document, message, image, and spreadsheet formats, among others. These documents may be handwritten documents, computer processed documents, partially handwritten documents, partially computer processed documents, and documents which are both handwritten, and computer processed.

The documents may include specific data which is to be identified and processed by the processing system 101. The documents may include loss run documents, exposure documents, applications, questionnaires, emails, clearance, standardized forms, structured forms, urgency and triage related forms, broker specifications, entities (e.g., ACCORD), and carrier supplementals, and other document types specialized to the commercial insurance industry. Inputs to processing system 101 may be received from one or more sources for example through one or more application programming interfaces (APIs) of the processing system 101, one or more secure file transfer protocols SFTPs of the processing system 101, Amazon Web Services (AWS) Simple Storage Service (S3), and/or through email, among other sources.

Processing system 101 may include a number of components including an OCR engine 115 that is configured to receive and process scanned documents 106, one or more modeling entities 116 that permits one or more machine learning models to be created, trained and executed. System 101 may include one or more AI engines 117 which can be any type of artificial intelligence engine, machine learning engine, neural network or other component that can interpret data.

System 101 may also include one or more workflows 109 which define how data and portions of data may be operated on by system 101. Workflows 109 may involve one or more tasks to be completed on the data of a particular system input. Further, system 101 may be configured to allow the system or users to create annotations 110 in relation to data elements. Further, system 101 may include a number of interfaces 111 which may include, for example, programmatic and/or human-based interfaces.

Further, system 101 includes quality-checking components (e.g., component 112) that may check, delete, or correct receive data as it is processed by the system. Further, system 101 may include one or more data transformation components 113 that permit data to be transformed into other forms, locations or formats. Also, system 101 may include one or more tasks 114 that are created during the processing of certain workflows. Tasks may be performed automatically, for example, by one or more processes within system 101, or may involve one or more humans in the form of human-in-the-loop interfaces (e.g., component 108).

As discussed, system 101 may provide one or more outputs 118 such as, for example, predictions, loss modeling information, risk assessments, alarms, dashboard information, reports, and any other data that might be used by third-party entities such as third-party systems 119. For example, these systems may be customer systems that receive one or more outputs for the purposes including, but not limited to, evaluating a subject claim, series of claims, monitor and perform reporting, among other tasks and functions.

The system may receive inputs and analyze the inputs to determine a particular workflow to be completed for each input. Each workflow may involve tasks related to each specific input. For example, documents in particular formats or containing particular types of data may require different workflows from other documents. The workflow for a hand-written document may include processing by OCR engine 115, while the workflow for a DOCX format input may not include OCR processing.

Figure 2:
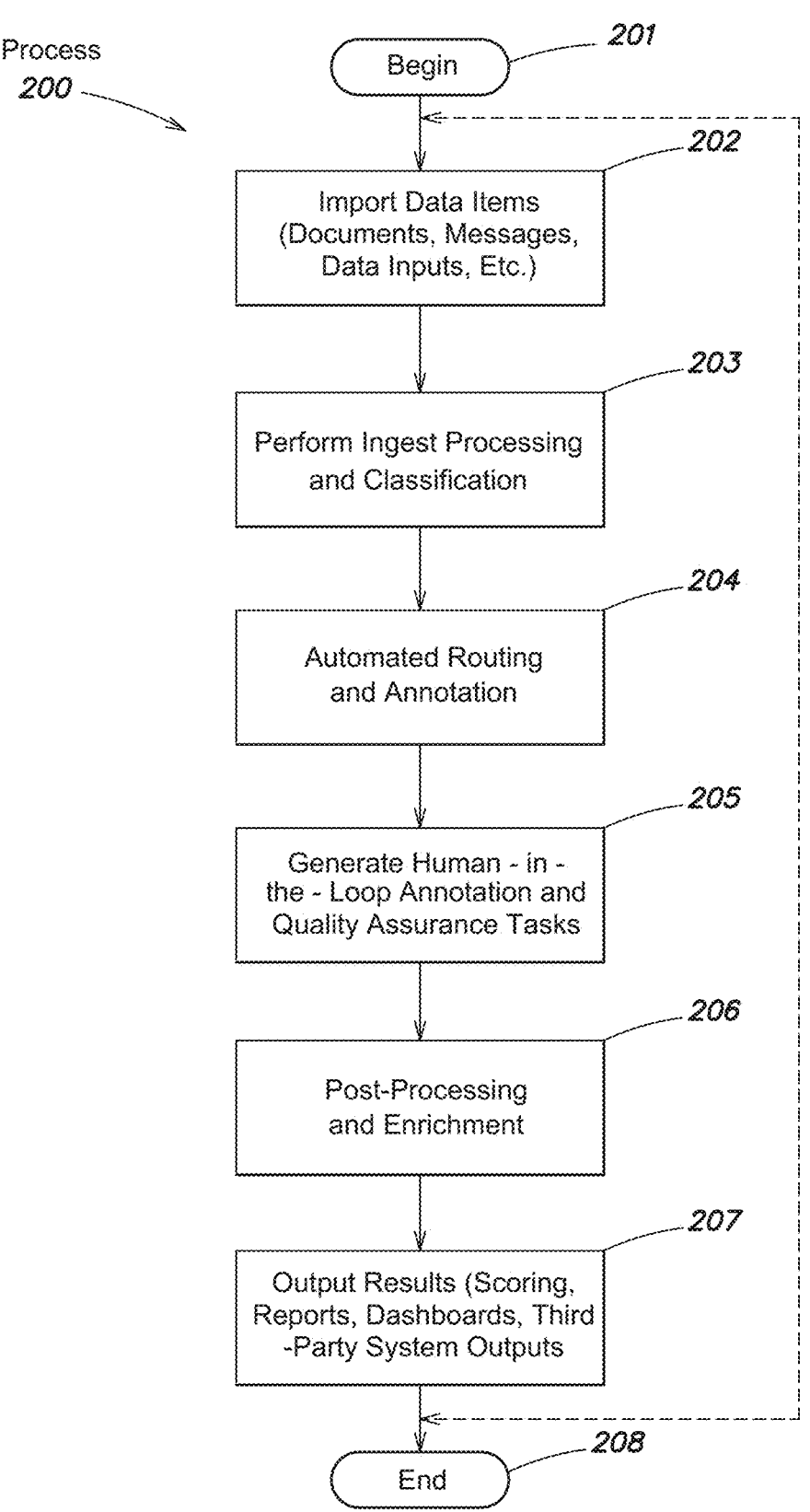
FIG. 2 shows an example process for processing documents according to various embodiments.

As discussed, certain embodiments relate to systems capable of processing multiple data elements from various sources, and for determining certain measurements relating to a business, such as, for example, the commercial insurance industry. FIG. 2 shows an example process 200 for processing documents according to various embodiments.

At block 201, process 200 begins. At block 202 the system (e.g., distributed system 100) imports one or more data items such as documents, messages, data inputs, scanned documents, or other types of data, such as inputs 102, 103, 104, 105, 106, and 107, as discussed regarding FIG. 1. At block 203, the system performs ingest processing and classification of these items. Such processing may include, for example, data extraction processes, classification of data, entity recognition of certain data items, image processing, OCR functions, among other processing. This processing may be performed by components of a system such as OCR engines, modeling components, wand workflows, as discussed regarding FIG. 1.

At block 204, the system performs quality assurance annotation. According to some embodiments, it is appreciated that for accurate measurements to be performed, the system should ensure the data is accurate as possible during the data input process. Such quality assurance functions may include, for example, labeling of particular data entities (e.g., automated or manual or combination thereof), grouping and labeling functions, error detection, and other functions, either with or without human interaction. The quality assurance annotation may involve analyzing one or more features of the input documents or data to determine whether human interactions or tasks are required. It may be determined that a human-in-the-loop task is required for a particular input if the document type of the input (e.g., damages document, claim document, assessment document, etc.) cannot be identified by the ingest processing performed at block 203. For example, at block 205, the system may generate human-in-the-loop tasks relating to quality assurance for particular data items. The human-in-the-loop tasks may include document classification; definition of the boundary between distinct documents merged together in a single file; annotation of individual fields within documents, and correction of errors arising from automated processes. The human-in-the-loop tasks may be generated with a specific instruction of the task to be performed and provided to one or more users via an interface of the system.

At block 206, the system performs post-processing and enrichment of particular data items. Post-processing functions may include, for example, packaging of data for final deliverables (e.g., for customers), delivery of data to customer systems, and creation of databases and records, among other tasks. Data may be packaged into suitable file formats or data structures, as discussed herein. Data may be delivered to customers using any suitable method including one or more application programming interfaces (APIs) of the processing system, one or more secure file transfer protocols SFTPs of the processing system, Amazon Web Services (AWS) transfer for SFTP (AWS Simple Storage Service (S3)), Sharefile delivery, Amazon simple email service, and/or through email, among other methods described herein. At block 207, the system outputs any results such as scoring, reports, dashboards, output to third-party systems, or perform any other output. At block 208, process 200 ends, however it should be appreciated that the system may constantly import, process, and output results to one or more interfaces and systems in real time, and the system may continually perform process 200.

Figure 3:
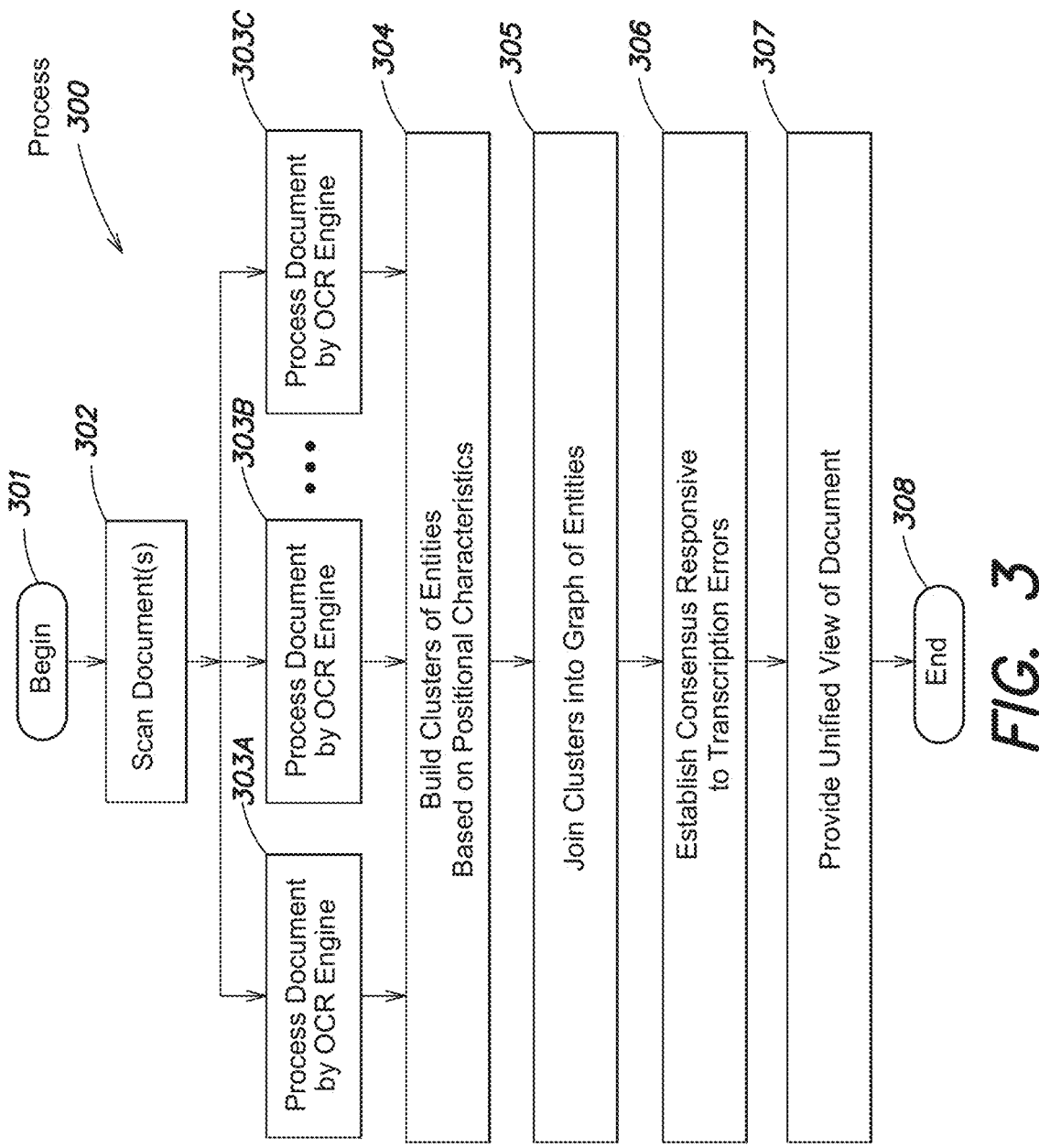
FIG. 3 shows an example process for performing optical character recognition (OCR) of documents according to various embodiments.

FIG. 3 shows an example process 300 for performing optical character recognition (OCR) of documents according to various embodiments. At block 301, process 300 begins. At block 302, the system scans one or more documents for processing. Scanning the one or more documents may involve converting the documents to a particular data structure or file format for OCR to be performed on the documents. According to some embodiments, it is appreciated that to provide more accurate data, it is realized that initial quality of documents received from customers is a wide range of quality. High quality documents may be quickly and accurately processed by OCR engines, resulting in accurate data associated with the text found within a particular document. Poor quality documents may not be accurately analyzed by OCR engines, and the associated output data may not be accurate relative to the text in the document. In such cases, the documents may be requested in a higher quality format from input sources, or may require human analysis or annotation, as described herein, to determine the text within the document. Medium quality documents may result in some errors in the results provided by OCR engines, which may be effectively resolved through analysis by multiple OCR engines, as described herein. Such analysis may additionally boost the accuracy of analysis of low quality documents. Therefore, according to some embodiments, multiple OCR engines assess a document in concert, and the system resolves the results into a single unified view.

In blocks 303A-303C, the scanned document is processed by the respective OCR engines in parallel, and results are provided to components for resolving propensities and providing the unified view of the document. As shown, the document is processed by three OCR engine, however, in some examples, any suitable number of OCR engines may be used. For example, the document may be processed by one OCR engine, two OCR engines, four OCR engines, up to ten OCR engines, up to 15 ORC engines, or greater than 15 OCR engines. At block 304, for each output produced by the respective OCR engine, the system builds clusters of entities based on positional characteristics. In some embodiments, the clusters of entities are words which are positionally related to one another in, for example, an interval tree. At block 305, the system joins clusters of entities into a graph of entities. At block 306, the system establishes a consensus responsive to any transcription errors and provides a unified view of the document at block 307. At block 308, process 300 ends.

In a more detailed procedure, the system performs a document preparation function, a word production function, followed by a word ensembling production. A graph production for each page is produced, and then downstream consumers use the graph production for classification, annotation, and other processing tasks.

During document production, documents are queued, and words are extracted from the queued documents via OCR or direct extraction. When processing is initiated on a document, the document is first split into individual pages. Individual pages are then queued for processing by multiple word producers—a word producer may be, for example, an OCR engine or other method for extracting text from a document, such as a Microsoft document file reader, or a PDF text reader (for instance, Tesseract, Google Vision, PDFMiner, and readers for proprietary Microsoft format or other word reader may be used). In some examples, multiple pages may be processed simultaneously.

In a word production process, each page is processed in parallel by a fleet of OCR worker processes. Each OCR worker uses a given word producer to process the page and produce an output file (e.g., in JSON format). Once all pages are processed by all word producers, a trigger is fired to create an ensemble output. If there is a problem processing any given page due to bad data or a service interruption, the solution may degrade gracefully by using the output that is available.

In a word ensembling process, each group of word producer outputs for each page is processed together. In some embodiments, the process is identical for each page and can be executed in parallel. The system then merges words from separate sources—each word bounding box from all word producers is joined into a graph, containing properties for position, text content, and area overlap with other graph nodes. The system may format and clean lines of words—based on position and overlap, interval trees are constructed over horizontal areas to help smooth the bounding box information, specifically to organize all the words into neat lines. In some examples, interval trees are joined into a graph of entities using connected component analysis. The system may then clean up any stray bounding boxes. In particular, errant nodes in the word graph are pruned based on individual word producer confidence scores and other heuristics that may indicate an OCR fault. Index words are grouped into columns, as the word graph is partitioned into some number of vertical columns and then word groups are assigned to each column. The system then generates word clusters—within the graph, utilizes the connected components algorithm to create word clusters, and collapses the graph down to the clustered words.

The system may then generate a final word representation. In particular, for each cluster of words, the system resolves a final entity by utilizing a consensus method to correct for any OCR transcription errors. In some examples, the consensus method involves determining a distance between words in a cluster. In some examples, the consensus method involved determining the Levenshtein distance between words in a cluster. Also, bounding box area is resolved to eliminate overlap between separate word clusters to create more well-ordered word boundaries. In some examples, the final representation may be determined by the system executing a voting scheme, in which the outputs of the ORC engines are compared, and final words are determined for the output based on the most common words for each cluster. In some examples, the system may analyze clusters of words from the separate OCR engines to determine which words within clusters are "the same word" based on the positional and textual characteristics of the words. The voting scheme is then applied to determine the final word to use for each detected same word. If disagreement is found between the OCR engines, the word identified by the majority of OCR engines may be used. In some examples confidence scores of the OCR engine outputs may be used to determine the final identified word to be used. For example, if no majority is found between the OCR engines, the word with the highest confidence score may be used. In some examples, if no majority is found between the different OCR engines, the output of a single engine may be used as the default output. In some examples the output of the single engine may only be used if the associated confidence score is above a threshold confidence score. For example, Google Vision may be used as the default OCR engine if the confidence associated with the output is above a threshold confidence.

A final graph of each page is used to generate a JSON representation of all the words, bounding boxes, columns, and rows. Downstream consumers may then use this JSON representation for classification, annotation, and other processing tasks.

Figure 4:
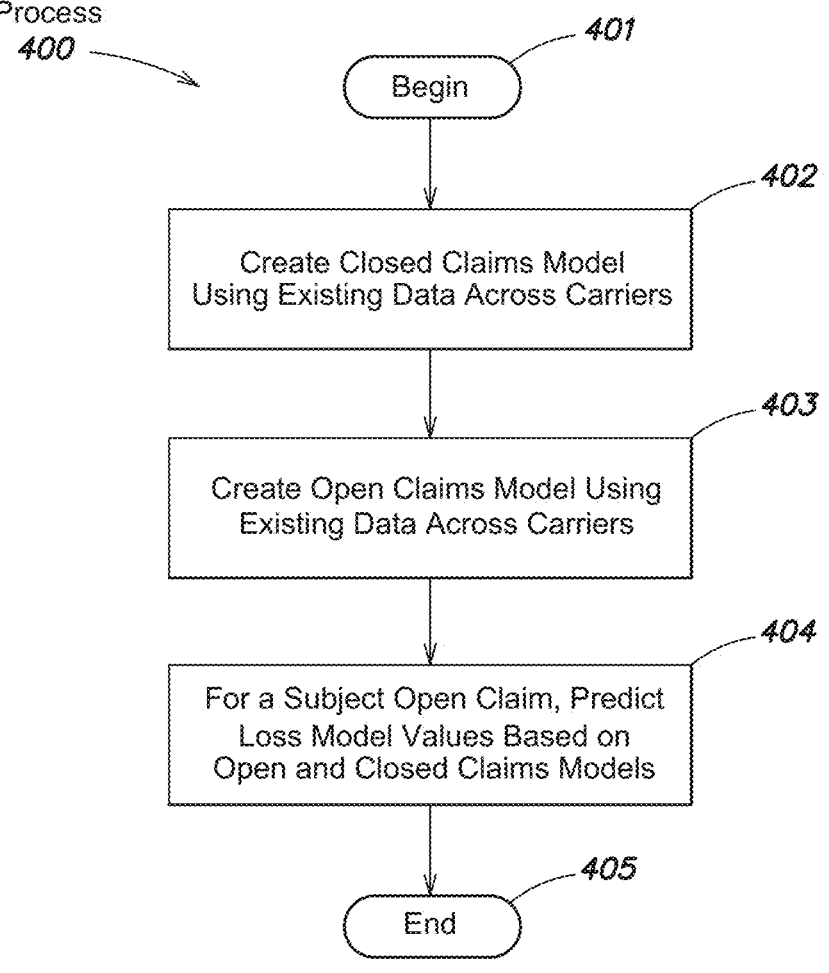
FIG. 4 shows an example machine learning process in relation to claims data according to various embodiments.

Further, as discussed above, different machine learning models may be used to predict claim information according to various embodiments. FIG. 4 shows an example machine learning process 400 in relation to claims data according to various embodiments. At block 401, process 400 begins. At block 402, the system creates a closed claims data model using existing closed claims data. For example, the system may use data sets from multiple insurance carriers that identify information relating to closed claims across these carriers. A closed claim is an insurance claim which has been completed, from the initial opening of the claim, any necessary compensation, and to the formal closing of the claim by the insurance provider. Closed claims include information about the particular insurance claim in the closed state and do not include information about the open state or any intermediate states. In some examples, the closed claim model may be configured to generate one or more outputs based on features of a received open claim. In some examples, the closed claim model may analyze features of the received open claim which do not change or are unlikely to change over the life of the claim to generate the one or more outputs. For example, the closed claim model may analyze claim features such as loss description, coverage type and line of business of the received open claim, among other claim features. In some examples, the closed claims model may analyze at least 10 features associated with a claim, at least 50 features associated with a claim, at least 100 features associated with a claim, at least 200 features associated with a claim or at least 500 features associated with a claim. In some examples, the one or more outputs may include a predicted total incurred value of the claim (e.g., amount paid+reserves of the claim), among other outputs which may be used in later processing of a received claim.

At block 403, the system also creates an open claims model using existing open claims data. The open claims model may employ data sets from multiple insurance carriers that identify information relating to open claims across these carriers. An open claim is an insurance claim which has not been completed. An open claim is formally opened, may have had some compensation paid out, however has not been formally closed. In some examples, open claims have had no compensation paid or may have had all compensation paid however have not been formally closed. In some examples, the open claims model may be configured to generate one or more outputs based on features of a received open claim. In some examples, the one or more outputs of the open claims model may include the total incurred for a particular claim. In some examples, the open claims model may analyze additional features of claims that are not analyzed the closed claims model. These may include features which may change over time. In some examples, the features of the claims which may be analyzed by the open claims model may include features such as coverage-type, loss-type, loss-description, litigation statuses, associated dates, line of business and financial values of a claim. In some examples, the open claims model may analyze at least 10 features associated with a claim, at least 50 features associated with a claim, at least 100 features associated with a claim, at least 200 features associated with a claim or at least 500 features associated with a claim.

Figure 7A:
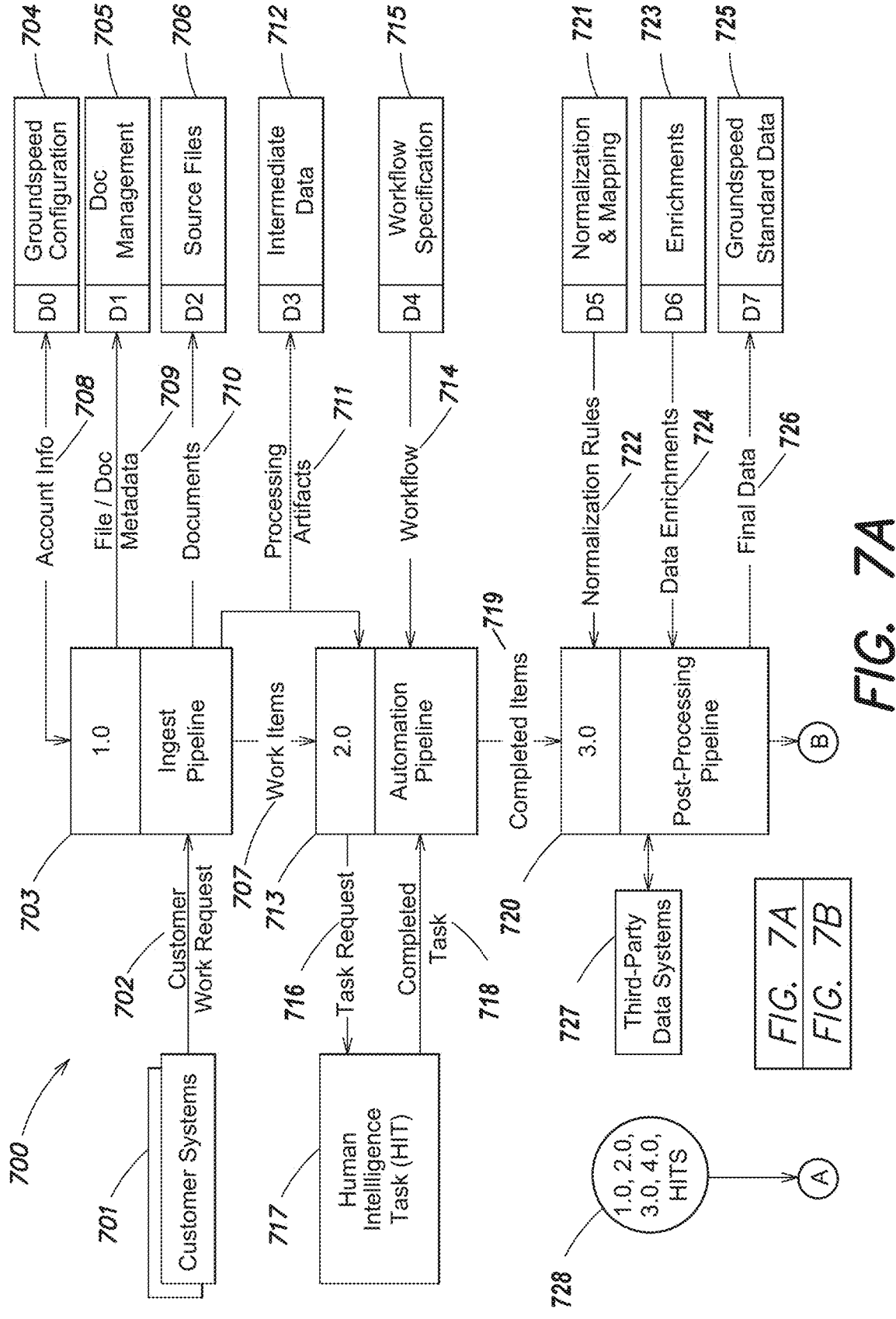
FIG. 7A shows various example pipeline stages that may be used to process document data, in connection with FIG. 7B, according to various embodiments.
Figure 7B:
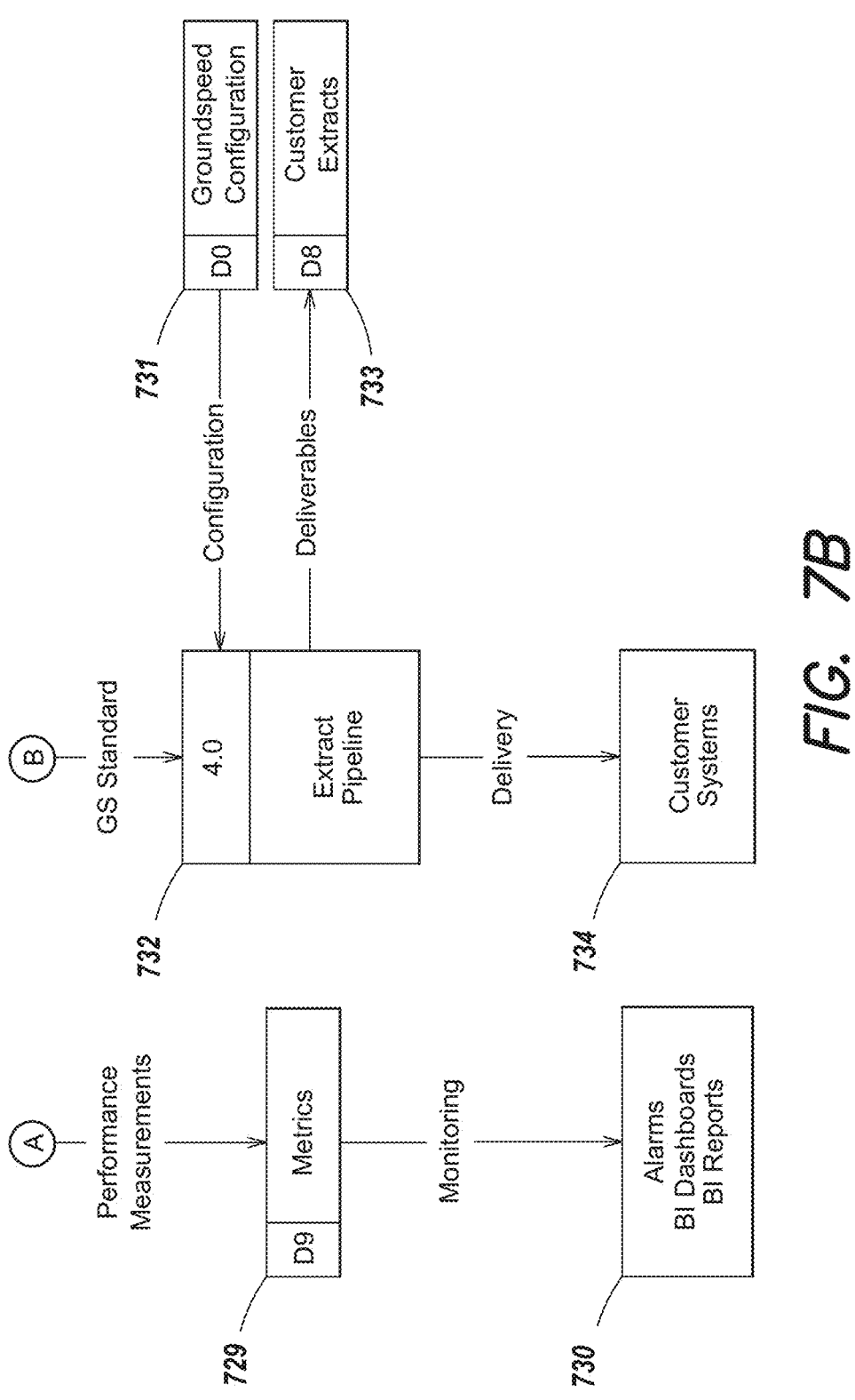
FIG. 7B shows various example pipeline stages that may be used to process document data, in connection with FIG. 7A, according to various embodiments.

In some examples, the data used to train the closed claims data model and open claims model may have been undergone document processing, as discussed herein, such as by a document processing pipeline as described regarding FIGS. 7A-B. In some examples, the models may be trained on historic insurance claims data, with the opens claims data being trained on historic open claims and the closed claims model trained on historic closed claims. In some examples, the training data may include tens of thousands of claims, hundreds of thousands of claims or millions of claims. In some examples, the training data may include insurance claims from the most common coverage types, including vehicle insurance, homeowners' insurance, general liability insurance, health insurance, among other coverage types.

In some examples, the data associated with the subject open claim to be analyzed by the open claims model and the closed claims model may have undergone document processing, as discussed herein. In some examples, the data associated with the subject open claim may include features such as coverage-type, loss-type, loss-description, litigation statuses, dates, line of business and financial values of the subject open claim. These features may be identified and extracted from claims data and documents as described herein, and for analysis by one or more of the open and closed claims models.

In some examples, the open and closed claims models may be implemented as machine learning models. The models may be trained as discussed herein. In some examples, the open and closed claims models are gradient boosting models. In some examples, the open and closed claims models may include multiple models including gradient boosting classifier models and gradient boosting regression models. In some examples, the open and closed claims models may be any suitable model including a probabilistic model, or a neural network-based model, among other models described herein.

At block 404, the system determines, for a subject open claim and using a loss prediction model, a prediction of loss values, based on outputs of both the open and closed claims models. The upstream open claims model and closed claim model analyze a given claim before the loss prediction model analyzes the claim. In some examples, the outputs of the open and closed claims models and the claim are used as inputs to the downstream loss prediction model. In some examples, the models may be arranged in a stacked configuration. In this way, more accurate predictions may be made using separate models which includes training data from multiple carriers. The loss prediction model may be implemented as a machine learning model. In some examples, the loss prediction model is implemented as a gradient boosting regressor model. In some examples the loss prediction model may be any suitable model including a probabilistic model, or a neural network-based model, among other models described herein. In some examples, the loss prediction model may receive outputs from one or more upstream models, for example the open claims model and the closed claims model. At block 405, process 400 ends.

In some examples, the loss prediction model may receive an open claim and provide a prediction of the total loss associated with the claim. In some examples, the loss prediction model may analyze one or more features of the claim, such as coverage-type, loss-type, loss-description, litigation statuses, dates, line of business and financial values of the subject open claim, in addition to the outputs of the open and closed claims models. In some examples, the loss prediction model may analyze at least 10 features, at least 50 features, at least 100 features, at least 200 features or at least 500 features.

In some examples, the loss prediction model may be configured to predict a ratio of a total paid of a future closed state of the subject insurance claim to a total currently incurred for the subject insurance claim. In some examples, the loss prediction model output may include a predicted total incurred, which is the predicted total payout of a given open claim.

In some examples, the loss prediction model output may include a reserve score indicative of the magnitude of over or under reserving for a given claim. For example, if the predicted total incurred is much less than the total reserves and the incurred losses for a given open claim, the reserve score may be over reserved or very over reserved, indicating an adjustment should be made to the reserves for the given open claim. Other examples of reserve scores include under reserved, very under reserved, and properly reserved, among other score indicators. In some examples the reserve scores may be numeric or may be based on any suitable scale. In some examples the reserve scores may be determined by comparing the difference between the reserves and predicted total incurred for a given open claim to a threshold difference.

In some examples, the magnitude of the difference between the reserves and the predicted total incurred may be compared to the threshold difference. In some examples the difference as a percentage of the total reserves may be compared to a threshold difference percentage. In some examples, open claims analyzed by the loss prediction model which are very under reserved or very over reserved may be flagged as abnormal claims. A user may analyze these abnormal claims to determine actions or adjustments to be performed related to the claims.

In some examples, the loss prediction model may be trained on a set of linked claims. Linked claims include an associated open and closed claim related to the same event. The open and closed states for a given claim provide information about the entire extent of the claim and allow for predictions about the known loss to be made based on the closed state of the claim from the initial open state of the claim.

In some examples, linking of claims data may be performed. For example, linking of claims data may involve analyzing a set of closed claims data and a set of open claims data and for each claim in the open and closed claims sets, analyzing fields of the claims to determine if any open claims are related to any closed claims. If an open claim and a closed claim are determined to be related, the claims may be linked and used for training the loss prediction model. Identifying linked claims or claims which can be linked provides additional information related to loss and allows for more accurate prediction of loss, as information about the entire lifecycle of the linked claims is available. After linking of a related open and closed claims, according to some embodiments, the linked claims may be used to train the loss prediction model.

In some implementations, the aforementioned open and closed claims models may be trained on open and closed claims, respectively, and may not be trained on linked claims. Linked claims are less common than individual open or closed claims. Therefore, the use of open and closed claim models allows for larger sets of training data to be used for the training of the open and closed claims models. This allows for more accurate outputs and/or predictions related to a received open claim to be generated by the open and closed claims models because of the large amount of data included in the training datasets. The outputs of these models and data related to the received open claim may be then passed to and used as inputs for the loss prediction model.

In some examples, the loss prediction model trained on linked claims may provide an estimate of total loss using the information about the open claim and the outputs of the open and closed claims models. This stacked structuring of machine learning models allows for more accurate output predictions to be made than models which are trained on only linked claims, only open claims, only closed claims, or individual models which are trained on a combination of open closed and/or linked claims. This is because in the models described herein, the features of a given open claim are analyzed with respect to both the open and closed states of claims, providing an initial view of the given open claim. This initial view is then analyzed using the loss prediction model, which, when given the outputs of the open and closed claims models, may predict how the given open claim may change over the life of the claim. This ability to generate outputs which are based on open and closed states and incorporate changes to claims over the life of claims provides more accurate outputs including predictions of loss. Additionally, outputs determined based on large datasets of open and closed claims, and linked claims datasets provide more robust models and more accurate outputs.

In some examples, the open claims model, closed claims model and loss prediction model may analyze features of a claim. The features may be analyzed by one or more data fields of the models. The features associated with the claim may be extracted from one or more documents associated with the claim, as discussed herein. In some examples, the data fields of the open claims model, closed claims model and/or loss prediction model may include one or more data field types including a policy year calculation field, a state calculation field, a coverage type field, a carrier calculation field, a status calculation field, an injury calculation field, an effective date calculation field, a date reported calculation field, a loss date calculation field, an expiration date calculation field, a notice date calculation field, a opened date calculation field, a valuation date calculation field, a cause field, a catalyst field, a body part field, a loss type field, a coverage type field, a loss description field, a in suit field, a litigation status field, a claimant name field, a insured name field, a valuation date field, a policy period field, a loss date field, a date reported field, a closed date field, an effective date field, an expiration date field, a print date field, a notice date field, a policy year field, a opened date field, a benefit state field, a driver name field, a jurisdiction field, a currency code calculation field, a country calculation field, a loss state field, a location code field, a location address field, a claim id field, a date of hire field, a age field, a risk state field, a date of birth field, a gender field, a received days field, a date reopened field, a status date field, a currency field, a collision incurred calculation field, a collision reserves calculation field, a comprehensive incurred calculation field, a expense incurred calculation field, a expense reserves calculation field, an indemnity incurred calculation field, an indemnity reserves calculation field, a legal incurred calculation field, a legal reserves calculation field, a loss incurred calculation field, a loss reserves calculation field, a medical incurred calculation field, a medical reserves calculation field, a net total incurred calculation field, a net total reserves calculation field, a permanent disability incurred calculation field, a permanent disability reserves calculation field, a temporary disability incurred calculation field, a temporary disability reserves calculation field, a total indemnity incurred calculation field, a total indemnity reserves calculation field, a total loss incurred calculation field, a total loss reserves calculation field, a total incurred calculation field, a total reserves calculation field, a expense paid calculation field, a expense recovered calculation field, an indemnity paid calculation field, an indemnity recovered calculation field, a legal paid calculation field, a legal recovered calculation field, a medical paid calculation field, a medical recovered calculation field, a net total paid calculation field, a total insured value calculation field, a total paid calculation field, a total payroll calculation field, a total property value calculation field, a total recovered calculation field, a temporary disability paid calculation field, a premium calculation field, a rate calculation field, a rated premium calculation field, a revenue calculation field, a collision paid calculation field, a collision recovered calculation field, a comprehensive paid calculation field, a comprehensive recovered calculation field, a loss paid calculation field, a total indemnity paid calculation field, a total indemnity recovered calculation field, a total loss paid calculation field, a total loss recovered calculation field, a permanent disability recovered calculation field, a permanent disability paid calculation field, a policy number calculation field, a total incurred field, a claim number calculation field, a expense reserves calculation field, a medical reserves calculation field, a total incurred calculation field, a total paid calculation field, total reserves calculation field, a litigation status field, a loss date calculation field, a valuation date calculation field, a in suit field, a carrier calculation field, a line type predicted field, and/or a line type predicted probability field.

In some examples, the use of the document processing, as discussed herein, may be used on the claims data provided to the open claims model, closed claims model and loss prediction model for analysis, as discussed herein. The document processing allows data and information from input documents to be extracted and analyzed by the open claims, closed claims, and loss prediction models. In some examples, the data extracted for analysis by the models includes coverage-type, loss-type, loss-description, litigation statuses, dates, line of business, and financial values. The analysis of data from the document processing allows for improved analysis of claims information, more accurate predictions of loss, and improved storage and maintenance of claims data and information. In addition, the training data for the open, closed and loss prediction models may undergo document processing, as discussed herein, allowing for models to be trained on a variety of documents and increasing the amount and accuracy of data available for training. This is because the document processing discussed herein allows documents, such as scanned or handwritten documents, which otherwise could not be used without significant processing to be efficiently analyzed and have data extracted. Therefore, this increase in the amount and type of documents which can be used in training allows for more robust and accurate models.

Figure 5:
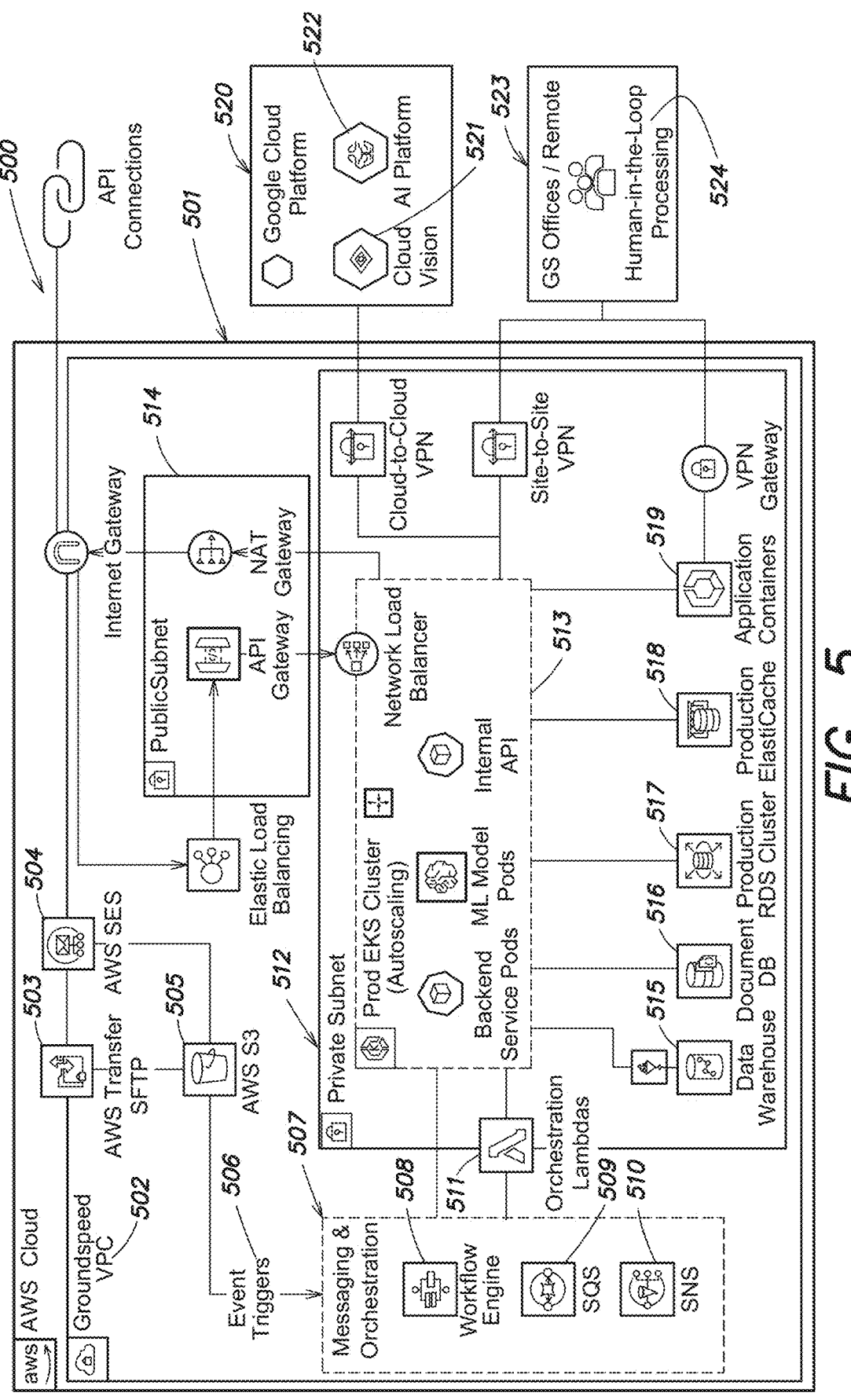
FIG. 5 shows a detailed system architecture for a distributed system that processes documents according to various embodiments.

As discussed, a new architecture may be provided for processing different data elements originating from a number of systems. FIG. 5 shows a detailed system architecture 500 for a distributed system that processes documents according to various embodiments. For example, architecture 500 may be implemented using various platforms, environments, and interfaces for example, the system may be implemented using cloud-based platforms such as, AWS cloud 501. In some examples, platforms such as Google cloud, Kubernetes, and other system elements and platforms may be used. For example, an implementation may be provided on AWS cloud where data, such as documents, is received via one or more API connections through an Internet gateway and stored within various AWS entities.

The system may be created within a Groundspeed virtual private cloud (VPC) 502. As referred to herein the Groundspeed system may include the main system elements that process the input data, perform the ingestion, cleaning, and reporting to third party systems. The system may receive data through any number of inputs, including AWS transfer SFTP 503, AWS SES 504, or any other suitable type of input, for example, Sharefile Ingestion. Information may be stored within an AWS S3 database instance 505.

Data stored within this database will cause the event triggers 506 which causes one or more data processing operations to happen via messaging and orchestration component 507. For example, a workflow engine 508 may be configured to create one or more workflows in relation to data elements received within various interfaces. In some examples, the workflow engine may analyze the received data to determine one or more processes which are to be performed on the data to prepare the data for later downstream processes, such as analysis by one or more models, as discussed herein. The workflows may include these processes which are to be performed. Messaging and orchestration component 507 may also initiate messages via the Amazon simple queue service (SQS) 509, create messages via the Amazon simple notation service (SNS) 510, among other functions. In some embodiments, the system may utilize orchestration lambdas 511 (e.g., AWS lambda, which is a serverless, event-driven compute service without provisioning) whereby lambdas are triggered to operate on particular data elements and perform particular functions.

In some implementations, a private subnet 512 is used with various elements to process and execute various functions in relation to code elements that are triggered via triggering of lambdas. In some embodiments, the system may trigger one or more human-in-the-loop processing functions 524 with one or more system offices were remote locations 523. Examples of human-in-the-loop processing functions are discussed herein. The system may store any resulting data within any number of data warehouses, databases, clusters or any other type of data structure. The system may employ various elements including a processing cluster 513, data warehouse 515, document DB 516 production RDS cluster 517, production ElastiCache 518 (e.g., or other memcache type), one or more application containers 519 or any other system elements or components for storage of the resulting data.

The processing cluster 513 may be connected via one or more gateways (e.g., an API gateway or a NAT gateway to a public subnet 514. The public subnet may connect the Groundspeed VPC 502 to the internet and/or other services via an internet gateway and one or more API connections. Elastic load balancing may be implemented to distribute incoming traffic from the internet gateway and the one or more API connections.

Further, the system may include any number of machine learning models and processes, interfaces, APIs, connectors, gateways, network load balancers or any other component. In some embodiments, the system may include one or more components that perform any number of artificial intelligence functions such as cloud vision 521 operating within a Google cloud platform 520 and AI platform (e.g., AI platform 522), or other similar cloud-based AI services. These components may perform analyses, such as discussed with relation to FIG. 4 and others discussed herein.

Figure 6A:
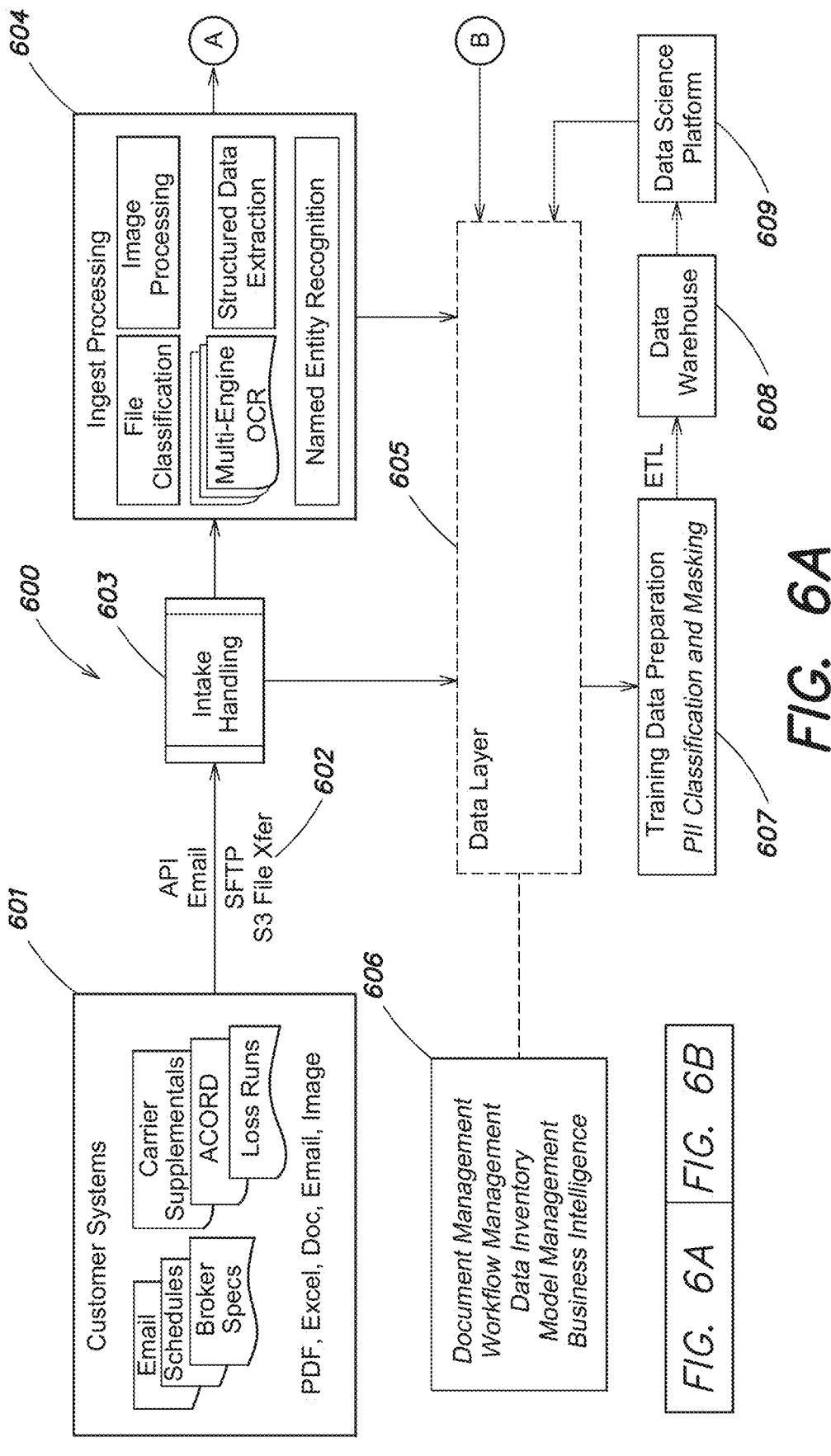
FIG. 6A shows a portion of an example process for processing document data, in connection with FIG. 6B, according to various embodiments.
Figure 6B:
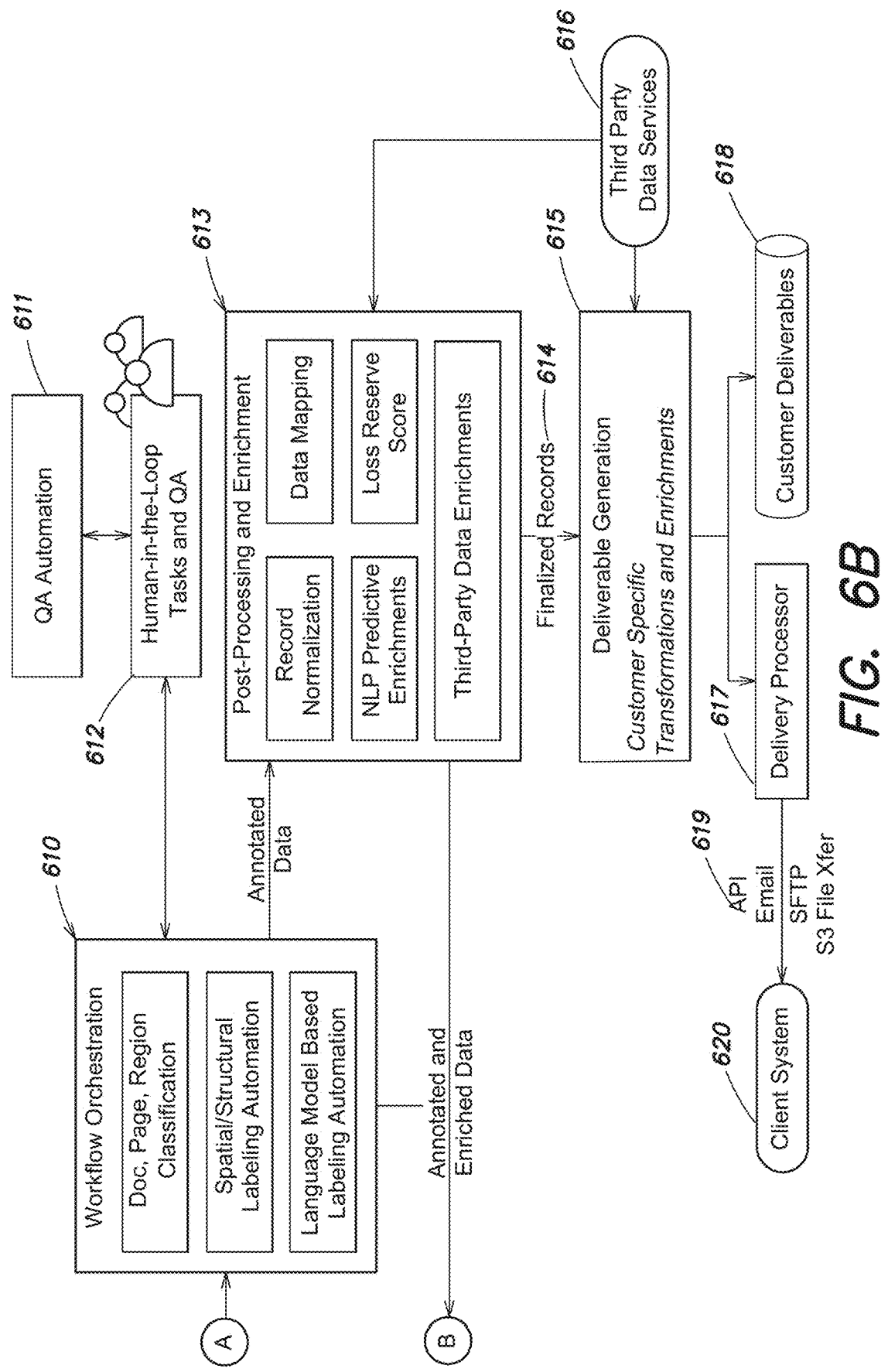
FIG. 6B shows a portion of an example process for processing document data, in connection with FIG. 6A, according to various embodiments.

As discussed above, the system may receive, and process information provided by disparate sources to determine measurements relating to a particular subject claim. FIGS. 6A-6B show an example process 600 for processing document data according to various embodiments. As shown, data may be received from customer systems 601 from one or more sources. For instance, data from one or more documents or portions thereof may be received and processed. For example, data may originate from any number and type of document or application including, but not limited to loss run, exposure, applications, questionnaires, emails, clearance, standardized forms, structured forms, urgency and triage related forms, broker specifications, entities (e.g., ACCORD), and carrier supplementals, and other document types specialized to the commercial insurance industry, in formats such as PDF, DOC, DOCX, TXT, CSV, PNG, JPEG, XLS, XLSX, XLC, JSON, and MSG among other text, document, message, image, and spreadsheet formats, among others.

These systems may transfer data to the processing system via transfer 602, which may involve one or more protocols, channels, or methods such as, for example, via email, SFTP, file transfer (e.g., S3 file transfer), API, or other method or protocol. Such information is provided to an intake handling component process 603 to an ingest processing component 604. Component 604 may perform one or more functions such as, for example, file classification, image processing, multi-engine OCR processing (e.g., for scanned documents), structured data extraction, and named entity recognition functions. Component 604 may, for example, extract particular features from the input data such as coverage-type, loss-type, loss-description, litigation statuses, dates and financial values.

The process may include one or more data layer functions 605 where data is stored, shared, and routed to different locations and functions. Further, the system may perform one or more management functions 606 such as document management, workflow management, data inventory, model management and business intelligence (BI) functions. In some examples, these functions may be used to determine additional processes to be performed on input data.

At block 607, there may be one or more training data preparation including personal identification classification and masking functions. In some examples, personal identification classification and masking may involve analyzing input data to determine if personally identifiable information is present and removing or masking the personally identifiable information. The processed information may be stored in a data storage entity such as a data warehouse 608. The information may be processed by one or more entities such as a data science platform 609.

After performing ingest processing, the system may perform one or more workflow orchestration functions 610. For example, the system may perform classifications of documents, pages, regions of documents or any portions thereof. Further, the system may perform one or more spatial or structure labeling automations. The system may perform any number of labeling automations using workflows. Using workflows, the system may produce annotated and/or enriched data and one or more processes. In some instances, there may be one or more quality assurance automation functions performed (e.g., at block 611) involving one or more human-in-the-loop tasks and quality assurances (e.g., at block 612). In some examples, the quality assurance automation 611 may function to analyze the documents and identify areas of the document which may require correction. Such areas may include areas of the documents which are poor quality, have unclear boundaries, have unclear handwriting, have unclear organization, among other potential issues which may require correction. The quality assurance functions ensure the data is accurate and suitable for use in other processes such as analysis by models and other processes discussed herein. In some examples, the QA automation 611 may analyze the annotated documents produced by human-in-the-loop tasks and QA 612, and determine whether additional tasks are necessary. In some examples the QA automation may determine one or more quality assurance tasks to be performed by a user of the system.

In some examples, the document, page or region classification may involve analyzing the received documents to determine a type of document (e.g., claims document, loss run document, carrier supplemental document, email, schedule document, broker specification document, ACORD document, among other documents that may be received), the pages and content of pages within the document, and the regions of the document (e.g., descriptions, claims, customer information, carrier information, financial information, tables, etc.). In some examples, the identified document types, pages and regions of the received documents may be used during later processing of the document and data associated with the document. In some examples, if the workflow orchestration 610 cannot automatically perform document, page, or region classifications (for example, due to low quality document, inconsistent document formatting, unusual document formatting, handwritten document, or other causes) one or more human-in-the-loop tasks may be generated which may be performed with relation to block 612. In some examples, the human-in-the-loop tasks may involve providing via a user interface, a document, instructions on how a user is to annotate the document for proper classification of the document, pages, or regions of the document, and controls for annotating the document. The user may interact with the user interface to annotate the document and the annotated document may be received by process 600 for continued processing. In some examples, the received documents may be separated based on the classification and routed to corresponding workflows based on the classifications.

In some examples, the workflow orchestration may involve spatial or structural labeling automations may include identification and labeling of the locations within a respective document of particular regions or aspects of the document for processing, for example as discussed regarding block 613. In some examples, the spatial labels may include labeling of header regions, table regions, table header regions, mid-level regions, claim regions, and page footer regions, and their locations within documents. In some examples, if automated spatial or structural labeling of the documents cannot be performed, one or more human-in-the-loop tasks may be generated for a user to perform, as described herein. In some examples, the documents may be divided into sections based on the spatial and structural labeling, for separate processing. For example, if a particular document contains a header region, two claims regions, and a footer region, the four different regions of the document may be separated from each other and processed individually. In some examples, the spatial or structural labeling may involve identifying particular data within the document locations and labeling the data and locations within the document for later processing. In some examples, particular data may be associated with specific regions or sections of documents. For example, information about the insurance carrier and client may be located within a header of a document, information about claim groupings in a loss run may be located within mid-level regions of a document, information about individual claims may be located within claim regions of a document, and administrative information may be located within a footer region of a document. In some examples, the data of particular regions or sections of a document may be applied differently to the other regions or sections of the document during analysis. For example, the information from a header region of a document may be applied to or used with all other regions or sections of the document, while information from a mid-level region of a document may only be applied to or used with claims within the mid-level region.

In some examples, the workflow orchestration may involve automated labeling by one or more language models. The language model labeling may involve using one or more language models (e.g., a Natural Language Processing (NLP) model, a Large Language Model (LLM), a probabilistic language model, a neural network-based language models, among other language models) to analyze the data of the documents. The language models may analyze the documents to determine and/or extract specific information from the documents.

In some examples, when automated workflow orchestration cannot be performed on the received documents, human-in-the-loop tasks may be generated in place of document, page, and region classification, spatial or structural labeling, and language model based labeling.

The data may be provided to a postprocessing and enrichment process 613 which may include one or more additional functions, such as, for example record normalization, data mapping, NLP predictive enrichments, qualitative predictive enrichments (e.g., loss reserve score, or loss prediction as discussed with relation to FIG. 4), and any third party data enrichments. As a result, one or more finalized records 614 may be produced that is used to constitute a deliverable generation step at block 615 which may include, for example, any customer specific transformations in enrichments. Further, in the deliverable generation, there may be one or more third-party data services 616 that provide additional information within the finished product. Such information may be delivered to the client system 620 via a transfer 619 performed by delivery processor 617, which may involve using one or more protocols (e.g., APIs, email, SFTP, S3 file transfer, or other method). Further, the record of the customer deliverables may be stored at block 618.

FIGS. 7A-7B show various example pipeline stages within an overall process 700 that may be used to process document data according to various embodiments. As discussed, various embodiments relate to a data driven system whereby customer data is processed by one or more data pipelines so that various measurements may be performed. More specifically, when one or more customer systems 701 generate customer work requests 702, which include customer data, and the corresponding data is processed by ingest pipeline 703. Account information 708 for a particular customer may be stored within and retrieved from system configuration (e.g., Groundspeed configuration 704) and may be used in ingest pipeline 703 for processing of customer work requests 702. Information received through the ingest pipeline may be stored by a document management entity 705 which receives and processes file and document information as well as metadata 709. Documents 710 are received and stored as source files 706.

When information is received through the ingest pipeline, one or more work items 707 may be created and fed to an automation pipeline 713. As discussed in more detail below, one or more tasks may be created (e.g., via task requests 716) that are handled by one or more human intelligence tasks 717. Such tasks may be fulfilled by one or more users and a completed task 718 is fed back into the automation pipeline. In some examples, the tasks may be created based on an analysis of the information and may include specific processes to be performed on the information.

There may be one or more processing artifacts 711 that are generated from ingesting of information and provided as intermediate data 712 and into automation pipeline 713. Further, workflows may be generated based on a workflow specifications 715 which creates a workflow 714 which is operated by the automation pipeline. Completed items 719 may be fed to a postprocessing pipeline 720. Some postprocessing functions may be performed such as normalization of mapping 721 via normalization role 722 also, data enrichments 723 may be performed and provided as data enrichments 724 to postprocessing pipeline 720. Information may be received and shared with third party data systems 727 as well as stored as final data 726 within the system (e.g., Groundspeed standard data 725).

Information 728 may produce one or more performance measurements and, as applied to metrics 729, may be used to monitor and provide outputs to one or more alarms, dashboards, and/or reports at block 730. As shown in FIGS. 7A-7B, labels 1.0, 2.0, 3.0, 4.0 refer to the stages of processing in diagram 7A and 7B, specifically: Ingest Pipeline, Automation Pipeline, Post-Processing Pipeline, Extract Pipeline, and Human Intelligence Task, and this shows that metrics may be collected at each stage of processing. Further, system standard data (e.g., Groundspeed standard data) may be used along with configuration information (e.g., Groundspeed configuration 731) by the extract pipeline 732 to produce deliverables for the customer (e.g., customer extracts 733). Further, the extract pipeline 732 may deliver data directly to one or more customer systems 734.

Figure 8A:
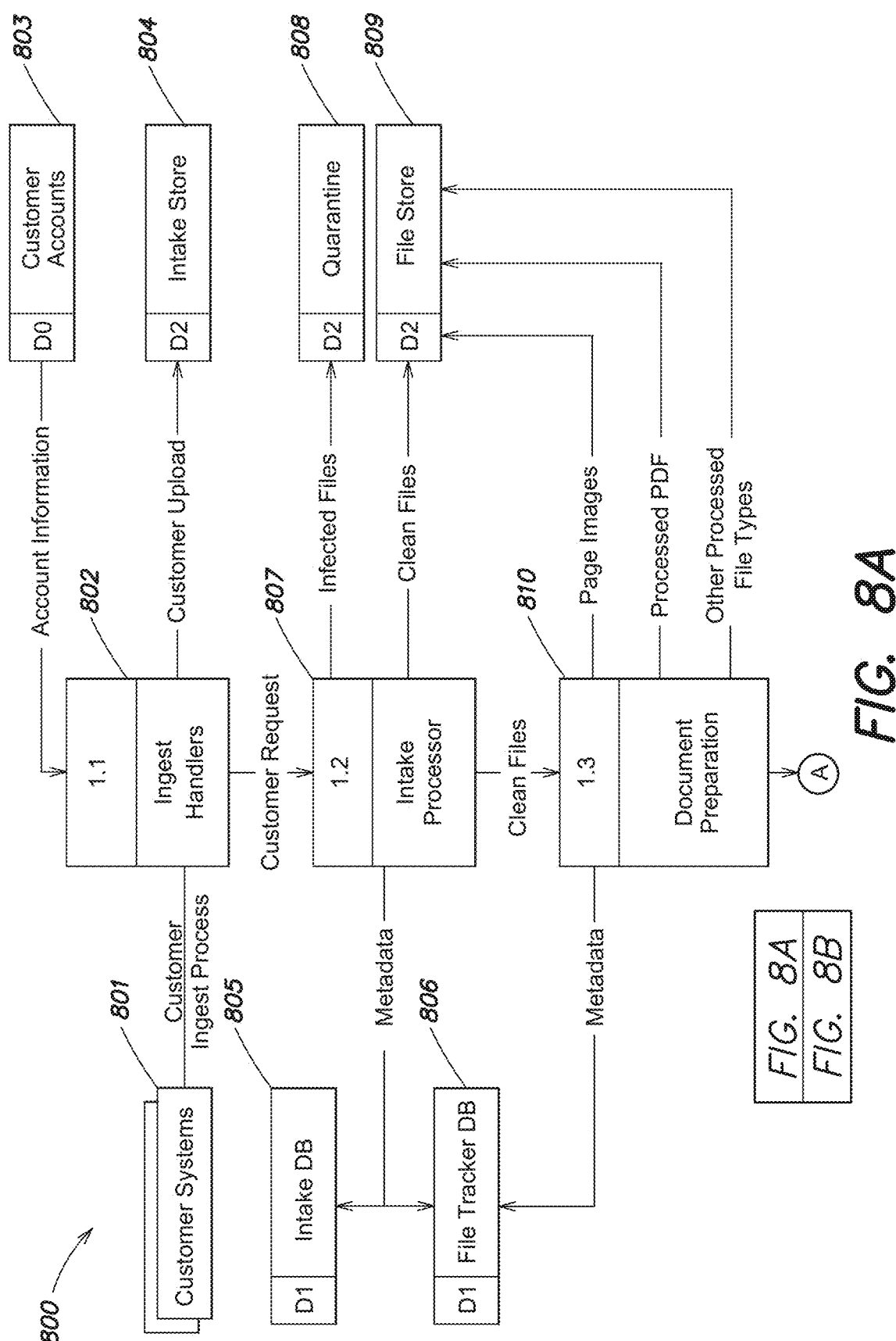
FIG. 8A shows various example system elements that may be used to process document data, in connection with FIG. 8B, according to various embodiments.
Figure 8B:
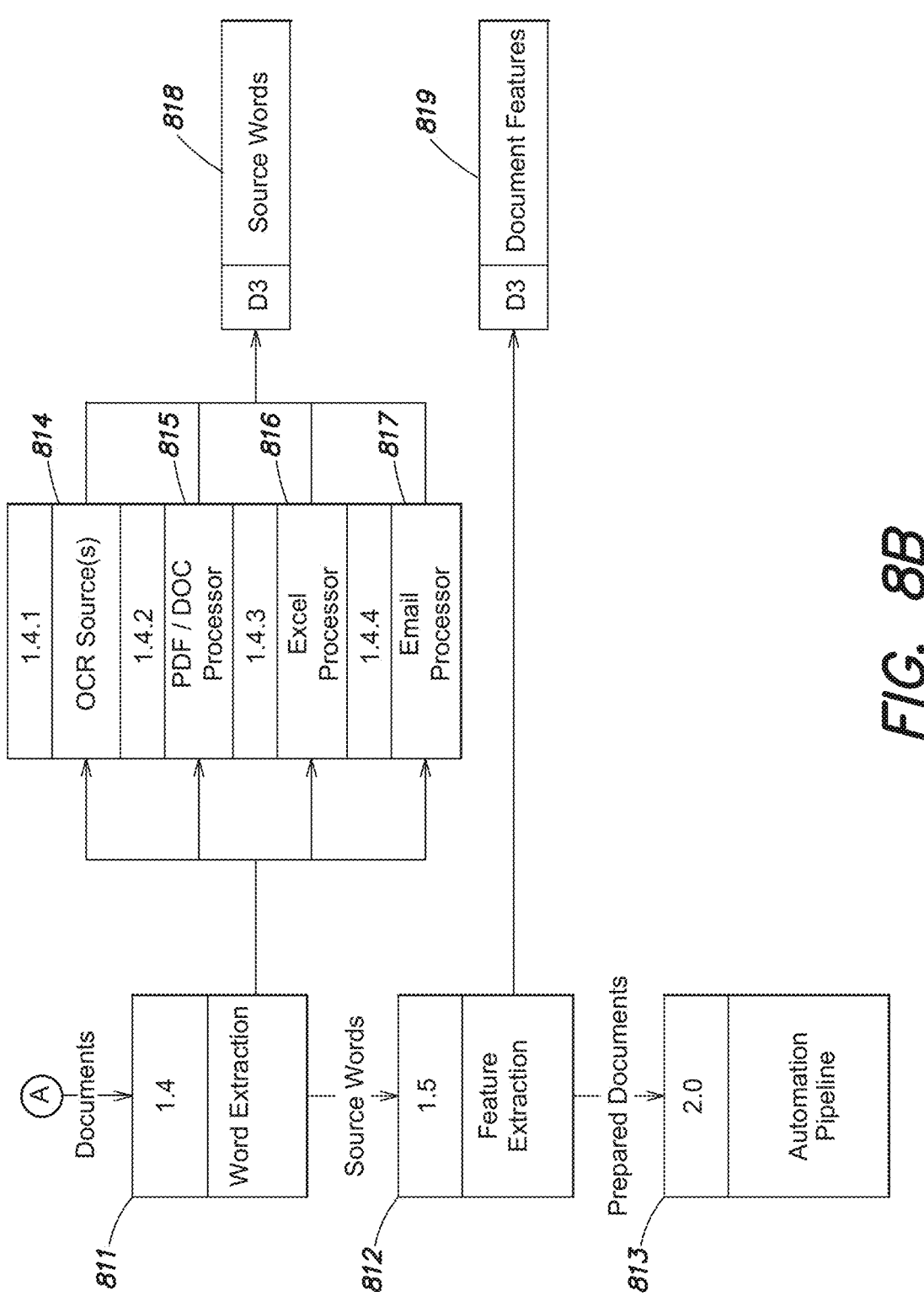
FIG. 8B shows various example system elements that may be used to process document data, in connection with FIG. 8A, according to various embodiments.

FIGS. 8A-8B show various example system elements of a distributed system 800 that may be used to process document data according to various embodiments. FIGS. 8A-B include elements which may perform processes as discussed with relation to the ingest pipeline of FIGS. 7A-7B. For example, during a customer ingest process, customer systems 801 a provide one or more documents or portions thereof to ingest handlers 802. Such information may be stored in an intake storage 804 (e.g., during a customer upload process). Further, information may be processed according to account information stored in one or more customer accounts 803.

Customer requests may be processed by an intake processor 807 and the data may be extracted and stored within an intake device 805 as well as a file tracker database 806. The intake processor 807 may analyze the data of customer requests to determine whether the files are infected with malicious code such as malware, viruses, ransomware etc. Infected files may be sent into a quarantine data structure 808 and clean files may be directed to a file store data structure 809. Clean files may be provided to document preparation processor 810 which extracts page images, processes PDFs, and processes other file types (e.g., documents, image files, or other types of data). Documents may lead to a word extraction processor 811 that feeds various information to one or more OCR sources 814, PDF/Doc processor 815, and Excel processor 816, and email processor 817, or other file type processor. Such processors may produce recognized source words 818 which may be sent to feature extraction processor 812 to identify document features 819. Prepared documents may be sent to an automation pipeline 813 for further processing.

Figure 9A:
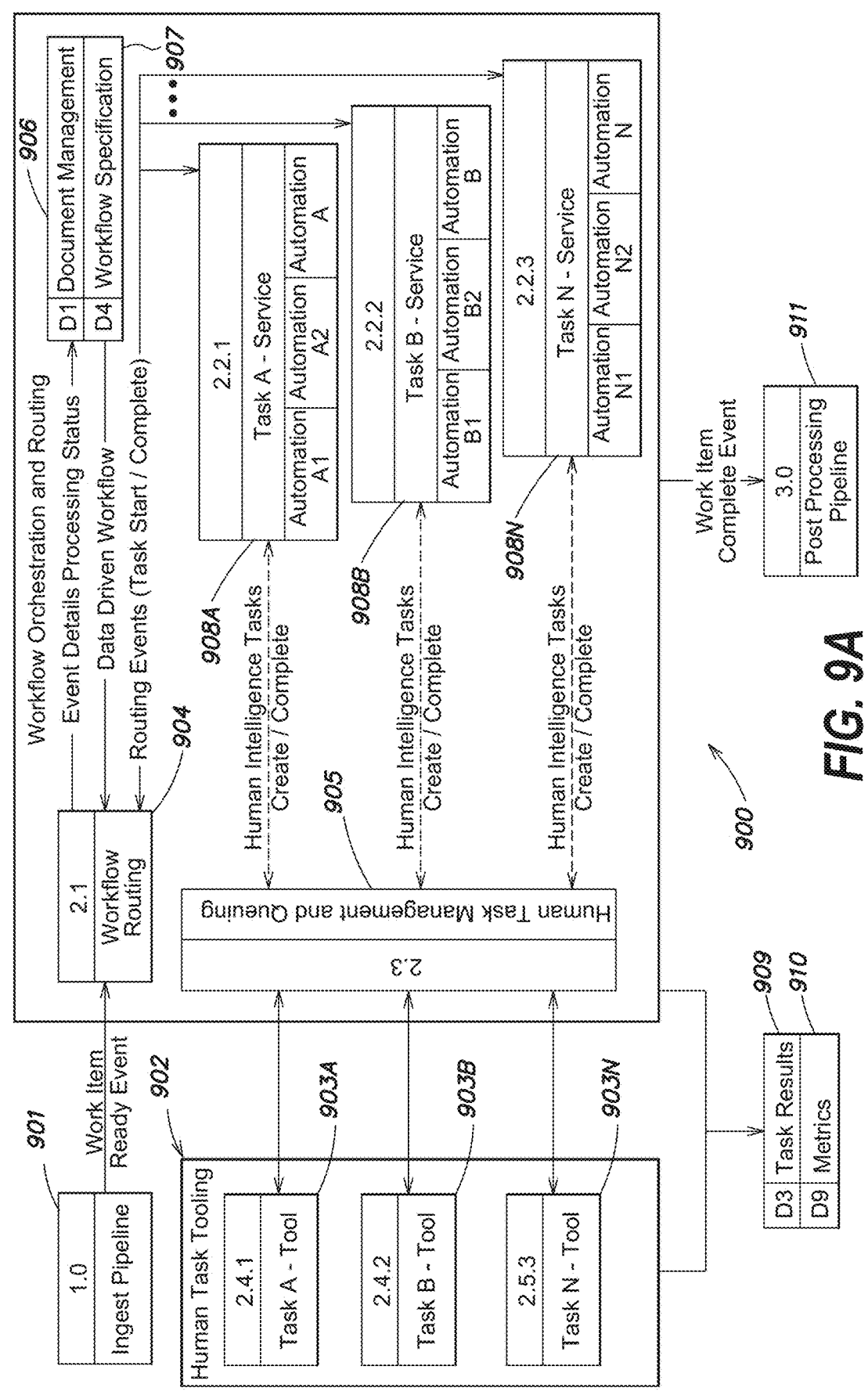
FIG. 9A shows example relations between workflows and tasks according to various embodiments.

As discussed, the system may be adapted to create a number of workflows and tasks responsive to a data ingest process. FIG. 9A shows example relations between workflows and tasks in a data handling process 900 according to various embodiments. Process 900 may include tasks and workflows as described with relation to the automation pipeline of FIGS. 7A-B. At block 901, data is ingested and processed by an ingest pipeline producing a work item ready event to a workflow orchestration and routing component. Various analyses may then be performed on the data.

A workflow routing processor 904 may receive the work item ready event and may provide information regarding processing status to a document management function 906. Based on a workflow specification 907, a data driven workflow may be instantiated which defines how the data will be processed. Routing events (e.g., test start, complete, etc.) may be created as data is processed by the service. Depending on the data one or more tasks may be created (e.g., tasks A, B, C, . . . , N (items 908A-908N)) which may involve one or more human intelligence tasks, which may be routed to human task tooling 902 via human task management and queuing 905.

The human task management and queuing component 905 may be used to communicate with human task tooling 902 which may include a number of interfaces were messaging functions that interact with one or more users. Human task management and queuing 905 may maintain unprocessed tasks which are to be completed by one or more users via tooling 902. Tooling 902 may include user interfaces which may be accessed and interacted with by users to complete human intelligence tasks. Tasks A, B, C, . . . , N may include one or more corresponding tools (e.g., Tools 903A-903N) that interact with users. One or more task results 909 are retrieved and stored and metrics 910 may be updated in relation to these task results. The tasks may include human-in-the-loop tasks as discussed herein. The human-in-the-loop tasks may include document classification; definition of the boundary between distinct documents merged together in a single file; annotation of individual fields within documents, and correction of errors arising from automated processes, as discussed herein. Upon receipt of a work item complete event, information processed based on the workflow event may be provided to postprocessing timeline 911.

Figure 9B:
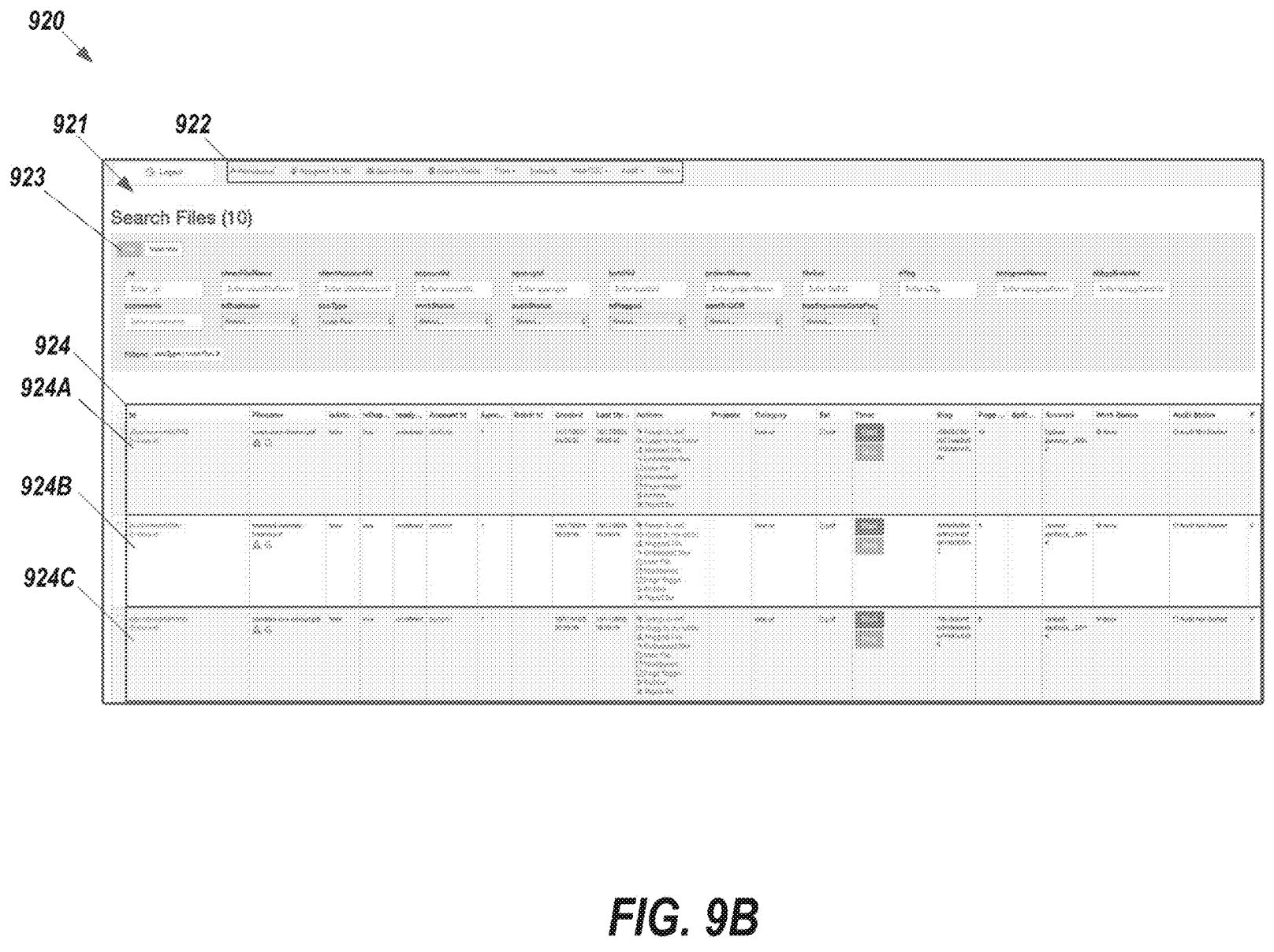

FIG. 9B provides a view of an example user interface page for selecting human-in-the-loop tasks. The user interface 920 may be displayed to a user of the system, for example through human task tooling 902, as described regarding FIG. 9A. The user interface may be provided remotely to a computer or other device of the user, for example through the internet. Shown on the user interface 920 is a page 921 for selecting and searching human-in-the-loop tasks. Other pages of the user interface may be accessed through user interface navigation toolbar 922.

In some examples, human-in-the-loop tasks may be provided to multiple users and each user may have multiple tasks assigned to them. The human-in-the-loop tasks assigned to a particular user may be viewed in the page 921 for selecting and searching tasks. A user may use one or more filters or searching tools within filtering and searching toolbar 923 to retrieve specific human-in-the-loop tasks from the list of tasks assigned to them. In some examples, users may filter or search for human-in-the-loop tasks from a list of all tasks assigned to all users, or a subset of tasks assigned to all users. The tasks which meet the selected criteria of the filtering and searching toolbar 923 may be displayed in table 924. Table 924 may default to displaying all tasks assigned to all users or all tasks assigned to a particular user if no criteria are selected in filtering and searching toolbar 923.

Table 924 of human-in-the-loop tasks contains rows, each associated with individual human-in-the-loop tasks. As shown, the first row is associated with task 924A, the second row is associated with task 924B, and the third row is associated with task 924C. The columns of the table 924 include specific features of each human-in-the-loop task. The information included in the columns may be analyzed by users to assist with tasks or may include functions associated with the tasks to be performed. As shown, the columns of the table include: an ID column, a Filename column, an isAttached column, an isDuplicated column, a ready column, an Account ID column, an Agent column, a Batch ID column, a Created column, a Last Updated column, an Actions column, a Projects column, a Category column, an Ext Column, a Timer column, an Etag column, a Pages column, a Split column, an Account column, a Work Status column, and an Audit Status column, among other columns. In some examples a greater or lesser number of columns may be included in table 924. Some columns may contain links or inputs for users to follow when completing tasks. For example, the Id column includes a link to the human-in-the-loop task associated with each row of the table 924, the account ID column includes a link to the account associated with the human-in-the-loop task associated with each row, the timer column includes inputs to start and stop timers associated with human-in-the-loop tasks. The actions column may include multiple links for each of the human-in-the-loop tasks associated with each row of the table. These links may include a link to assign the particular task to the user, a link to copy the task to a folder, a link to a mapped file, a link to embedded files, a link to view the file associated with the task, a link to a workbench to complete the task, a link to a page tracker, a link to archive the task and a link to reject the file associated with the task. By selecting any of the inputs or links within the table 924 the user may be brought to a different page of the user interface 920.

Figure 9C:
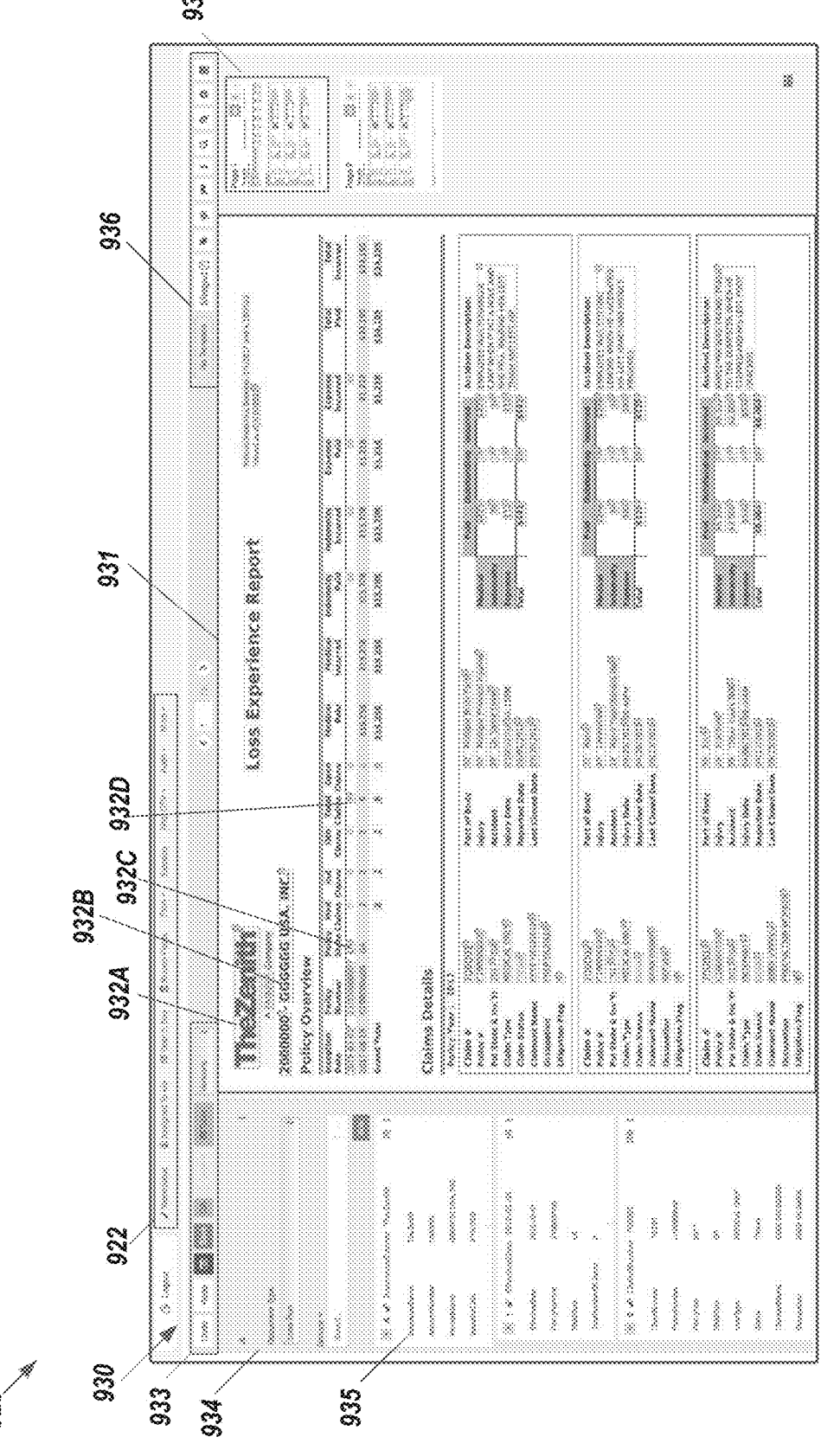
FIG. 9C shows an example view of a user interface for performing human-in-the-loop tasks; according to various embodiments.

FIG. 9C provides a view of an example user interface page for completing human-in-the-loop tasks. The user interface 920 may be displayed to a user as discussed herein. As shown, the user interface displays a task page 930 for completing human-in-the-loop tasks. Task page 930 may be displayed to a user after selecting one or more inputs from the page for selecting human-in-the-loop tasks, for example by selecting the workbench input as discussed with regard to FIG. 9B. The task page 930 includes a view of document 931 and human-in-the-loop task inputs 932A-D. Task input 932A allows a user to input a value related to an insurance provider associated with the document 931. Task input 932B allows a user to input a value related to an insured name associated with the document 931. Task input 932C allows a user to input a value related to a policy state associated with document 931. Task input 932D allows a user to input a value related to a total claims value associated with document 931. In some examples, the task inputs may be automatically identified and marked for users to complete during document processing as described herein. As shown, the document 931 includes multiple other task inputs for users to complete and/or confirm values.

In some examples, users may be provided with instructions on user interface 920 which explain how particular human-in-the-loop tasks are to be performed. Examples of instructions which may be provided to users include: locations within documents for particular data types, how to determine sections of documents, how to split documents, how to determine values associated with documents such as total incurred, what sections of the documents to label, which document values are to be used, values to search for within documents, and common errors to be fixed and/or addressed, among other instructions.

In some examples, to perform human-in-the-loop tasks, users may select a particular task input and may then be prompted to confirm or alter the value associated with the task input, to ensure the system has accurate values for all key parts of documents. In some examples, task inputs may additionally include selecting portions of documents, dividing documents into separate portions, identifying handwriting, and identifying particular values within a document, among other human-in-the-loop tasks described herein.

The task page 930 additionally includes task navigation toolbar 933 for completing one or more actions related to tasks. For example, users may select one or more inputs from task navigation toolbar 933 to undo an action, redo an action, view a table of actions, save a version of the document, check quality assurance values associated with the document, view a table of tasks associated with the document, or navigate to one or more versions of the document.

The task page 930 additionally includes document navigation pane 934 which may allow users to navigate to different sections of the document, change one or more properties associated with the document and view information associated with the document. Users may assign a document type or select a document type within document navigation pane 934 and may select or assign a group associated with the document in navigation pane 934. Navigation pane 934 additionally includes document section display 935 which may allow users view data contained within the different sections of the document including the account associated with the document, a policy within the account and a claim associated with the policy. The document section display may include information related to each of the sections of the document and an indication of the tasks to be performed within each section of the document.

The user may use document action toolbar 936 to perform one or more actions related to the document 931, for example selecting a template of the document, merging files associated with the document, tagging one or more portions of the document, commenting on one or more portions of the document, flagging one or more portions of the document, retrieving information such as metadata about the document, zooming in or out on the document, changing document settings, and storing the document. The user may additionally navigate to different pages of the document using document page navigation pane 937.

In some examples, the user interface may display different pages for different types of human-in-the-loop tasks to be completed by the users and may display different task inputs depending on the tasks to be completed by the user. In some examples, the pages and task inputs may be automatically generated during document processing and ingestion, as described herein. The provided user interface combined with automatically generated tasks streamlines the process for users to update and accurately input information related to documents and ensures that document data is accurately provided for later processing, for example through machine learning models and for document storage and maintenance.

Figure 10A:
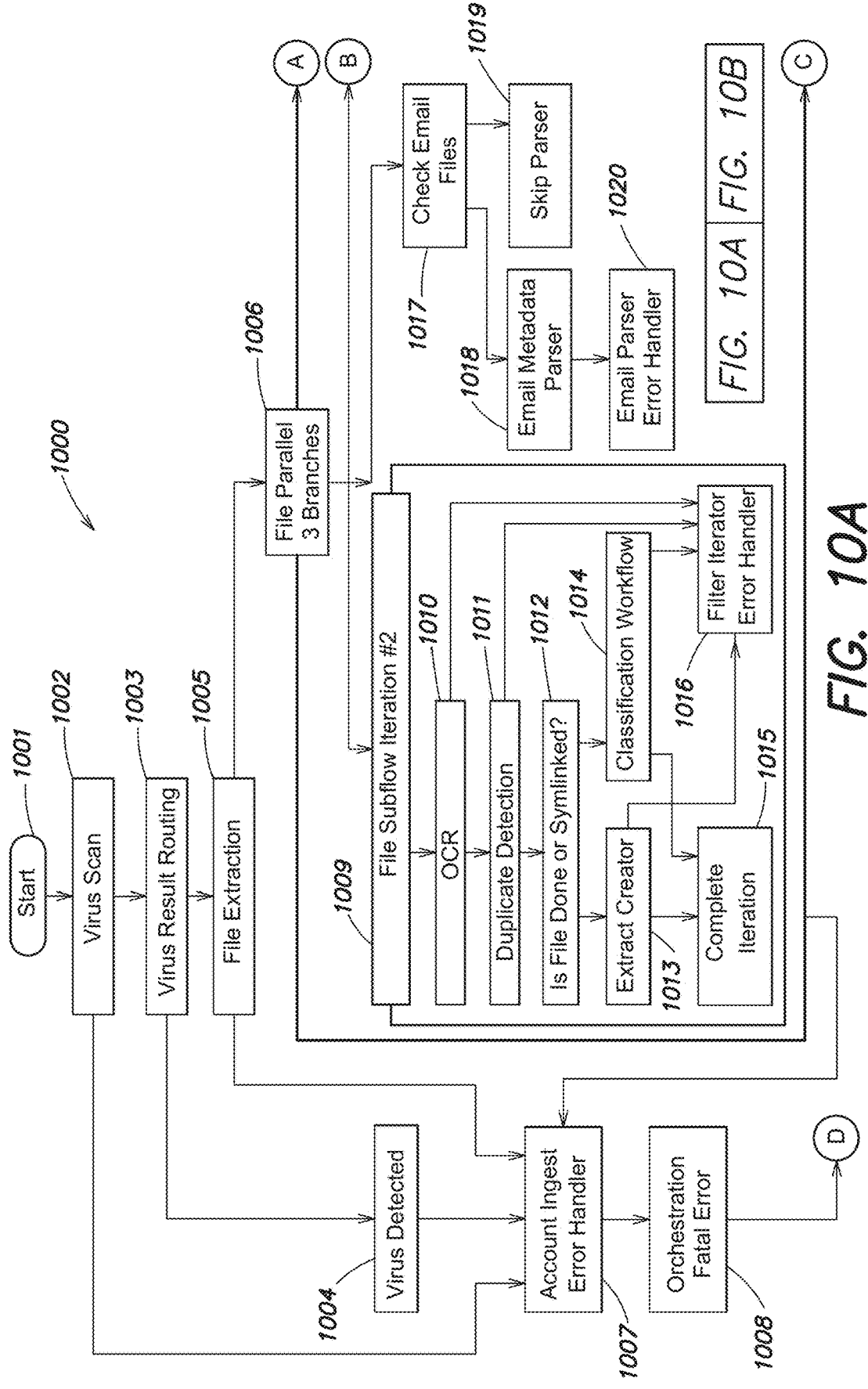
FIG. 10A shows a portion of an example process for processing documents and portions thereof, in combination with FIG. 10B, according to various embodiments.
Figure 10B:
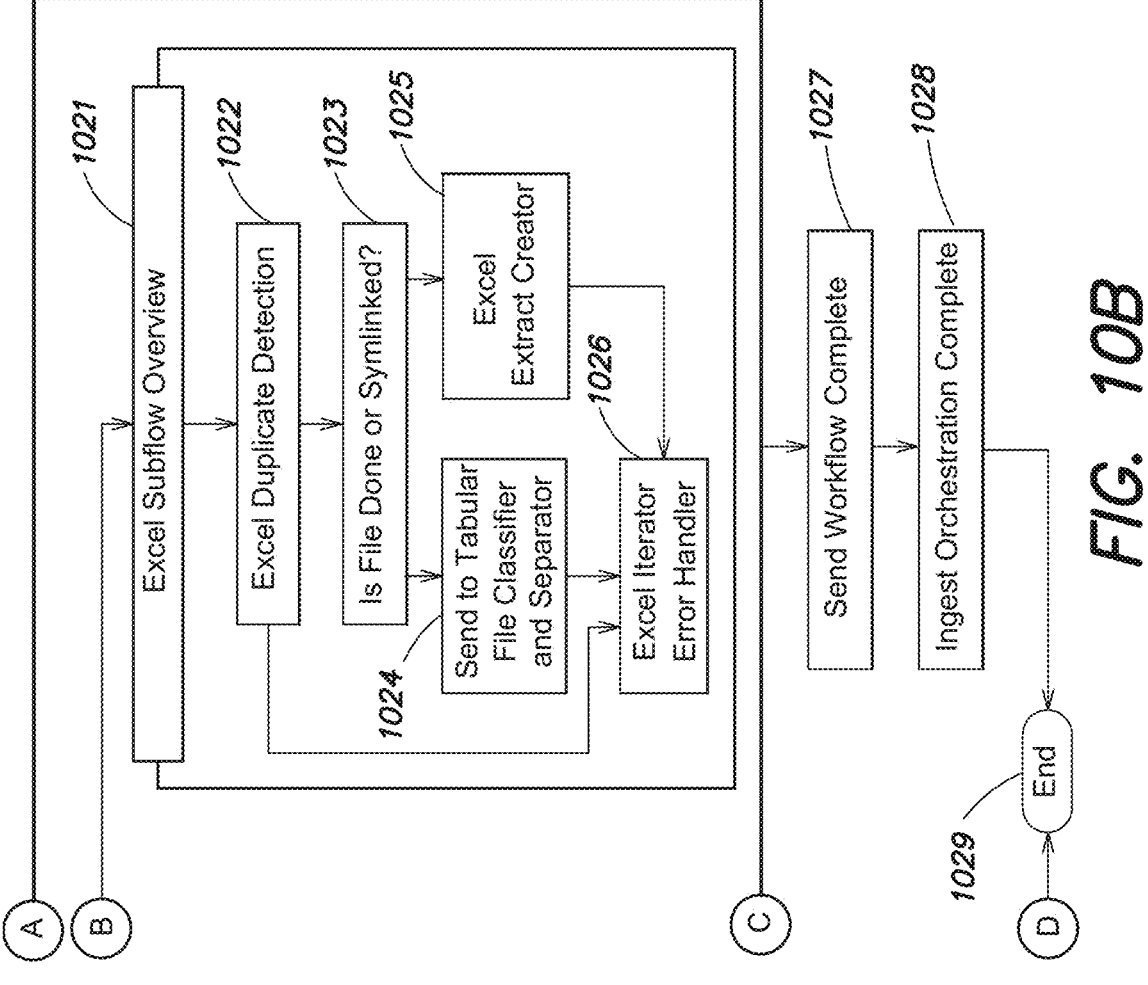
FIG. 10B shows a portion of an example process for processing documents and portions thereof, in combination with FIG. 10A, according to various embodiments.

FIGS. 10A-10B show an example process 1000 for processing documents and portions thereof according to various embodiments. The process 1000 may be performed by elements as discussed with relation to FIGS. 8A-B. At block 1001, process 1000 begins. At block 1002, the system performs a virus scan of the input data. At block 1003, the system performs a virus result routing. For example, if a virus was detected at block 1004, the system identifies that there was an error for the particular account and handler 1007 identifies that there is a fatal error at block 1008.

However, if the data is virus free, the system performs a file extraction at block 1005. At block 1006, the system processes the file in parallel branches. In one branch, the file set flow iteration 1009 sends the file to an OCR process 1010 print e.g., one or more parallel OCR steps as described herein) and the result is set to a duplicate detection block 1011. It is determined at block 1012 whether the file is done or symlinked, and if done in extract creator block 1013 is performed and a filter iterator error handler 1016 is executed. At block 1014, a classification workflow is executed, and the iteration is complete at block 1015.

In parallel branches, the process checks email files 1017, where it is routed to an email metadata parser 1018. Email parser error handler 1020 analyzes parts of the email information and reports errors. At block 1019, a skip parser block is executed, which may analyze the content of documents by skipping words in sentences of the document. For other file types (e.g., an Excel file), another process may be performed. For instance, for an Excel file, and Excel subplot flow overview 1021 block is executed, followed by an Excel of duplicate detection 1022. When the file is done assembling at block 1023 the file is sent to the tabular file classifier and separator at 1024 or is routed to an Excel extract creator at 1025. In some embodiments, a tabular file classifier and separator classifies the content within each separate tab of a given workbook and routes the content to the appropriate extraction mechanism depending on that content. At block 1026 an Excel iterator is executed an error handler which reports any errors. At block 1027 a workflow complete message is sent, and an ingestion orchestration complete message is sent at 1028. At block 1029, process 1000 ends.

Figure 11:
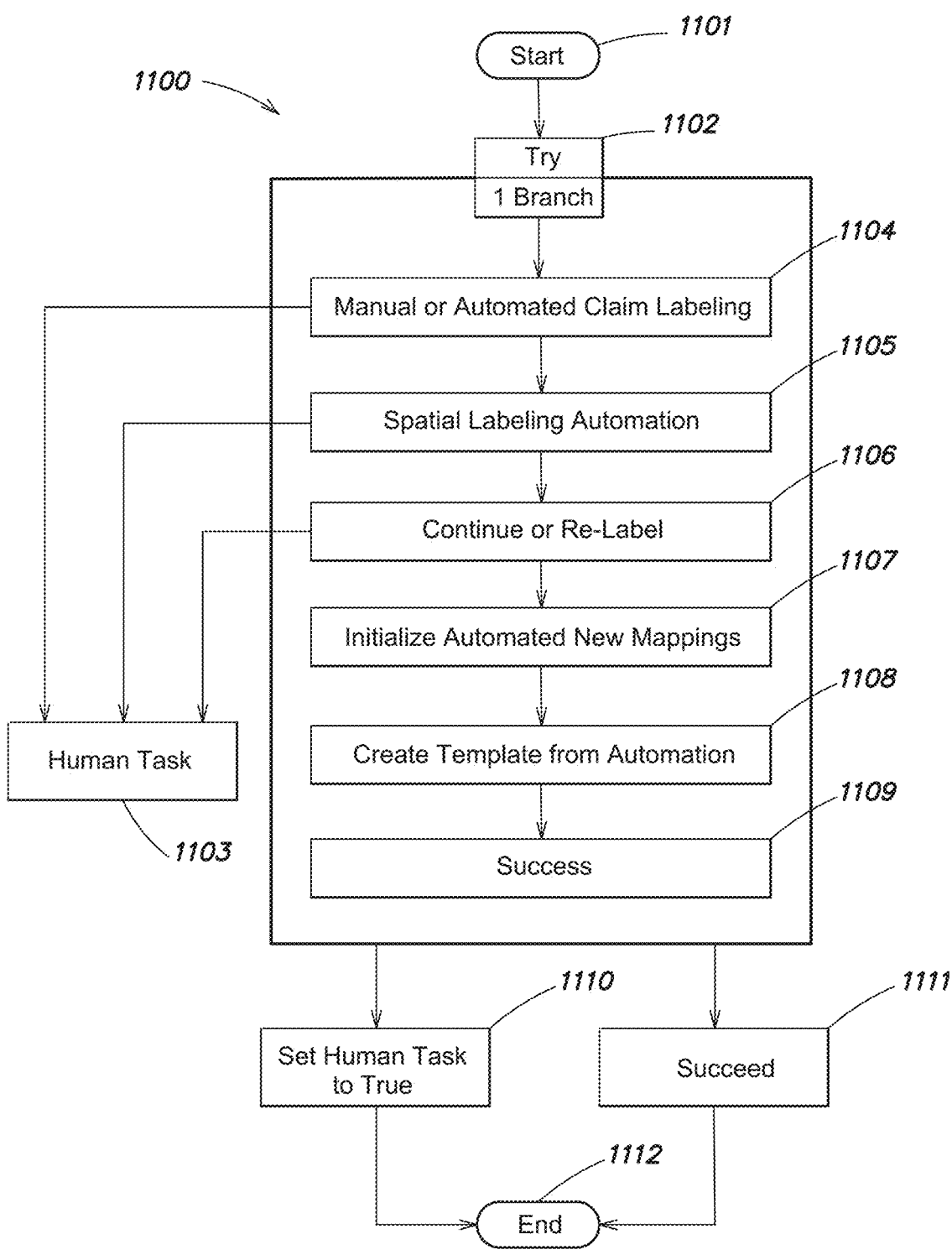
FIG. 11 shows an example process for labeling claims data according to various embodiments.

FIG. 11 shows an example process 1100 for labeling claims data according to various embodiments. At block 1101, process 1100 begins. Process 1100 may be performed in an automation pipeline as described with relation to FIGS. 7A-B and 9A-C. At block 1102, the system attempts to label one or more portions of a document. At block 1104, the system performs a manual or automatic claim labeling task. If manual, the system will generate a human task 1103 to assist in labeling. At block 1105, the system will perform spatial labeling automation. At block 1106, the system will continue or attempt to relabel certain portions or items within a document. At block 1107, the system may initialize automated new mappings where new elements or portions of documents are mapped (e.g., based on one or more human tasks). At block 1108, the system creates a template from the automation of labeling which can be used for further labeling of later—processed documents were portions thereof. At block 1109, the labeling task is indicated as a success. At block 1110, a human task is set to true (e.g., if human interaction was performed during the labeling process). Otherwise, the labeling succeeds at block 1111, and process 1100 ends at block 1112.

Figure 12:
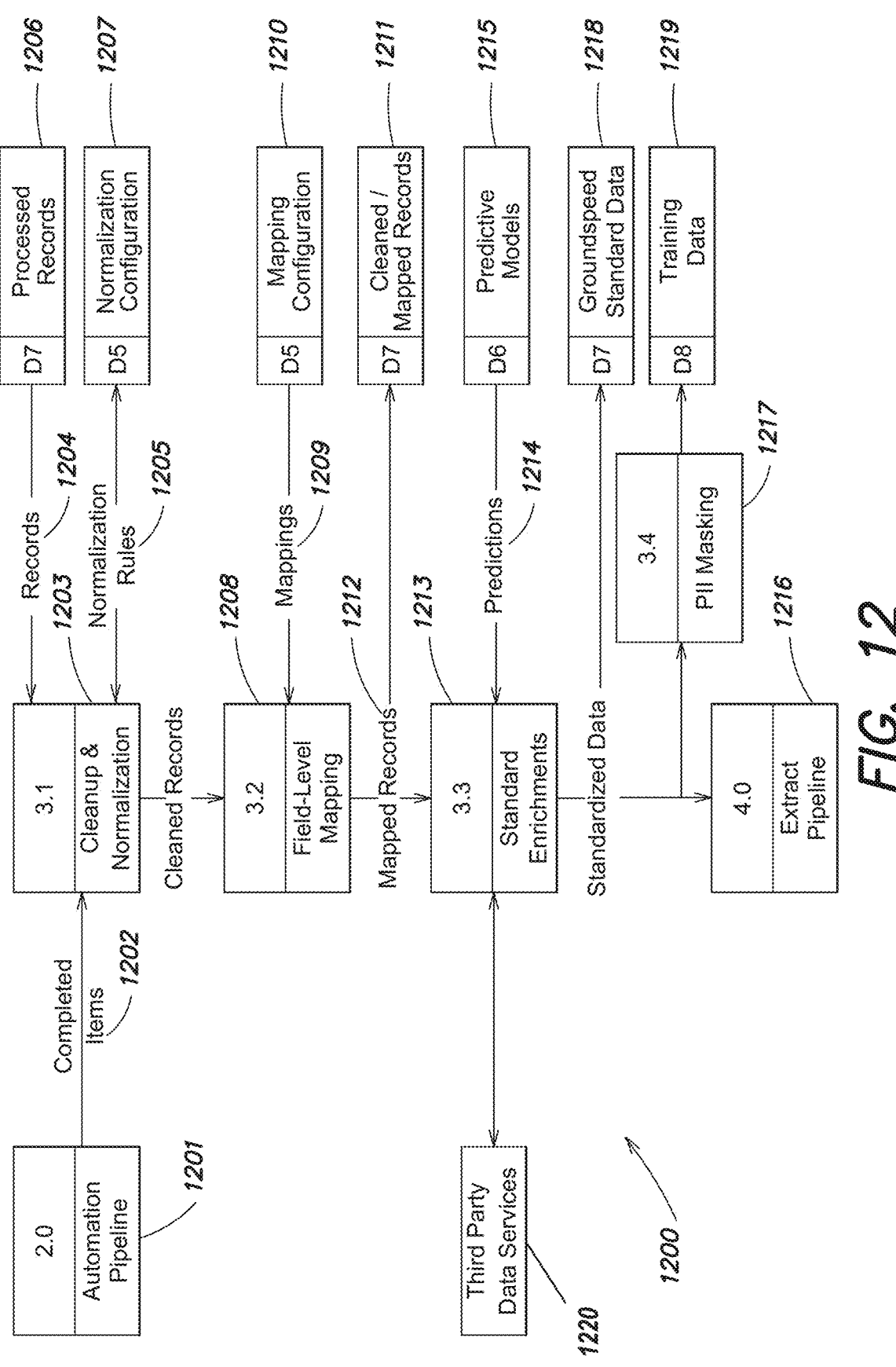
FIG. 12 shows example processes for processing claims data according to various embodiments.

FIG. 12 shows an example process 1200 and subprocesses for processing claims data according to various embodiments. Process 1200 may be performed as a part of a post-processing pipeline, for example as discussed with relation to FIGS. 7A-B. An automation pipeline 1201 may provide completed items 1202 for cleanup and normalization (e.g., at block 1203). A cleanup normalization procedure may accept records 1204 from one or more storage locations or processes such as processed records 1206. Further, procedure 1203 may accept one or more normalization rules 1205 such as those stored in a normalization configuration 1207. Procedure 1203 provides clean records which are then provided to field mapping procedure 1208.

Field level mapping procedure 1208 receives mappings 1209 such as those stored in the mapping configuration 1210. Procedure 1208 produces mapped records 1212 which are then provided to clean/mapped records 1211. Further, mapped records 1212 may be provided to a standard enrichments procedure 1213. The enrichments may include data provided by third party data services 1220 which can be combined/improved. The enrichments may include predictions 1214 provided by one or more predictive models 1215 which then produces standardized data which can be stored within a database (e.g., Groundspeed standard data 1218) and are provided to other processes such as personal identification information (PII) masking 1217 which can be then provided to a training component (e.g., as training data 1219). Further, such information may be provided to external systems (e.g., third party systems, customer systems, etc.) via an extract pipeline 1216.

Figure 13:
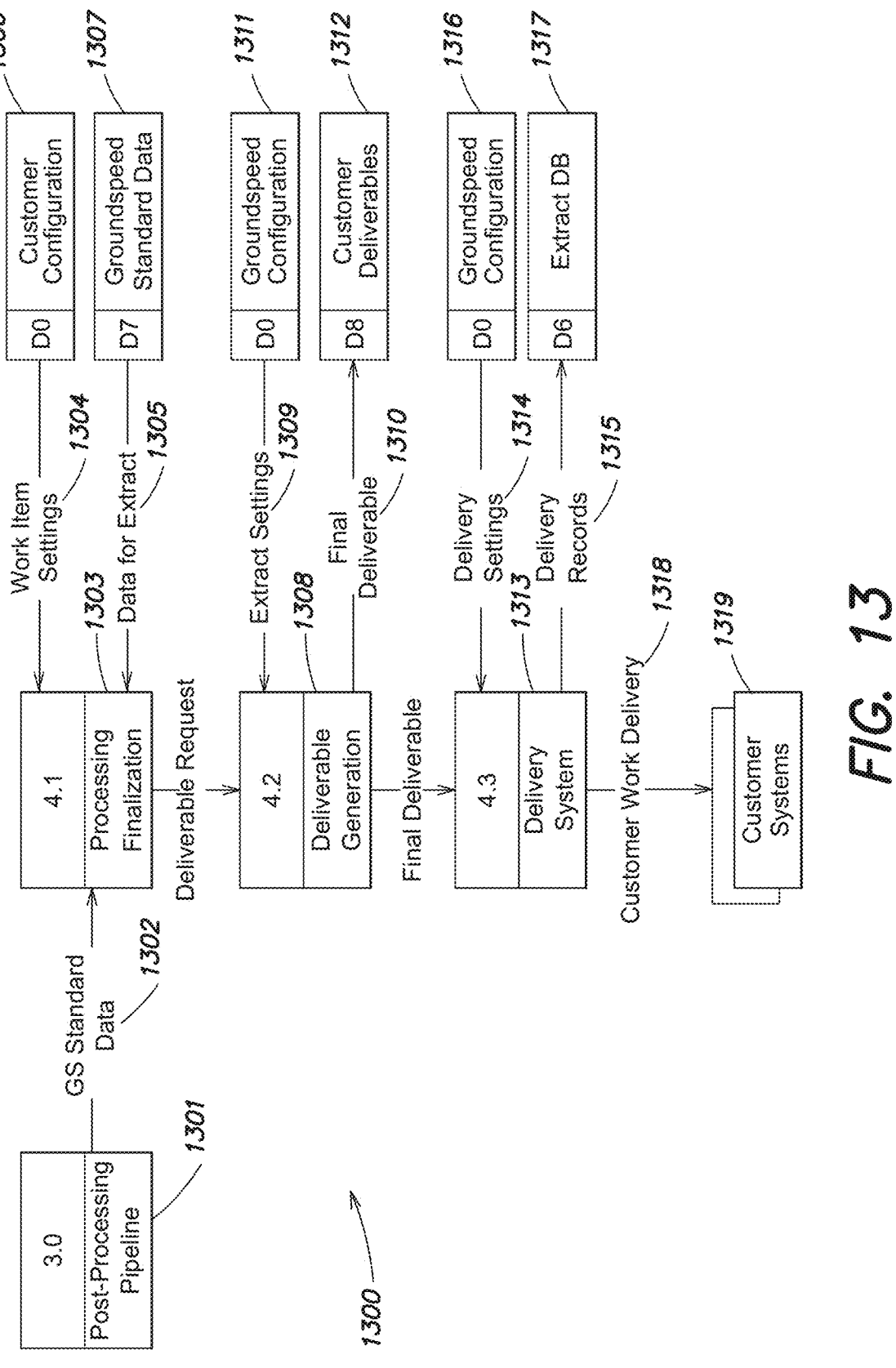
FIG. 13 shows example processes for producing deliverables to customer systems according to various embodiments.
Figure 14A:
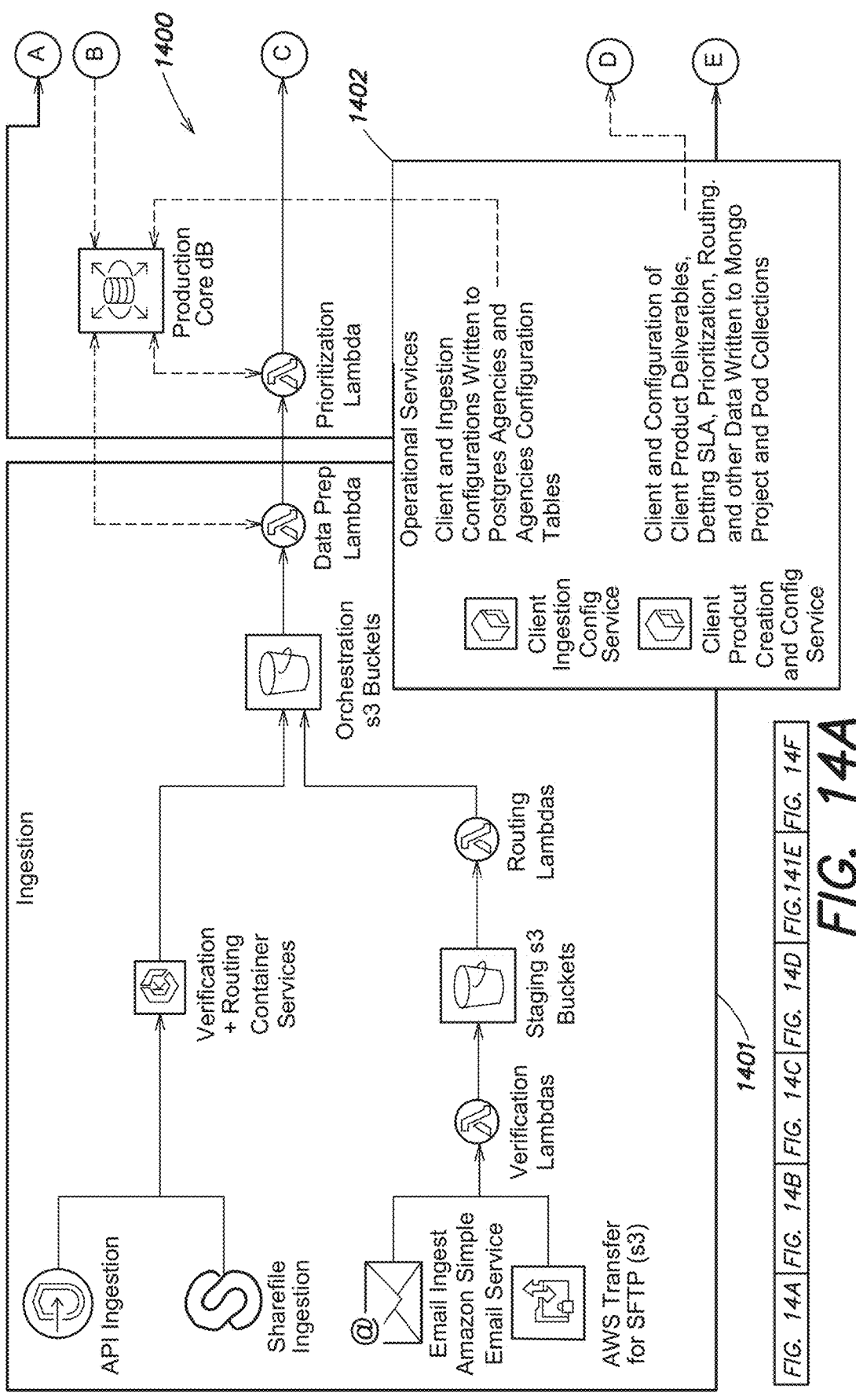
FIG. 14A shows a portion of an example pipeline flow for processing claims data, in combination with FIGS. 14B-F, according to various embodiments.
Figure 14B:
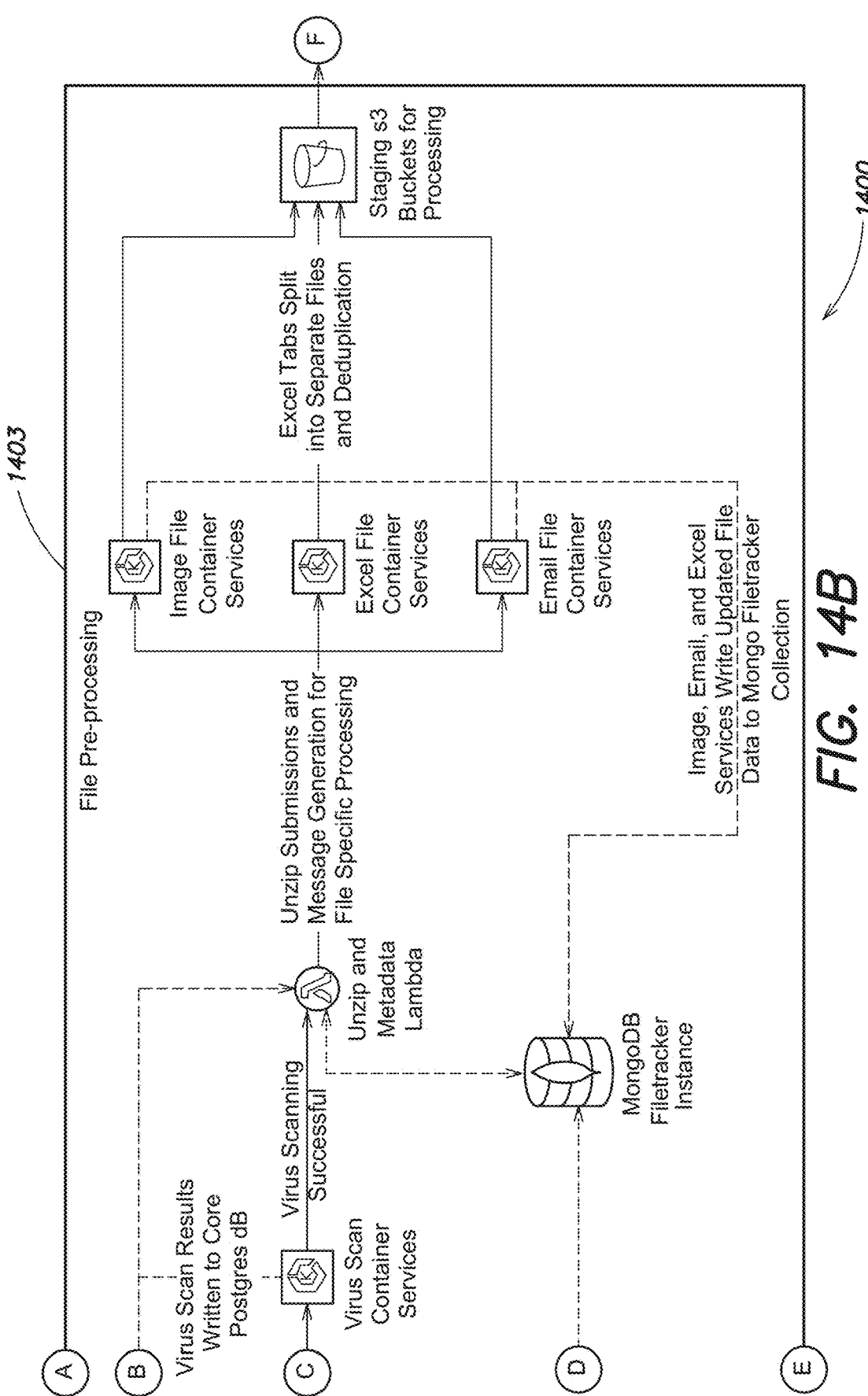
FIG. 14B shows a portion of an example pipeline flow for processing claims data, in combination with FIGS. 14A and C-F, according to various embodiments.
Figure 14C:
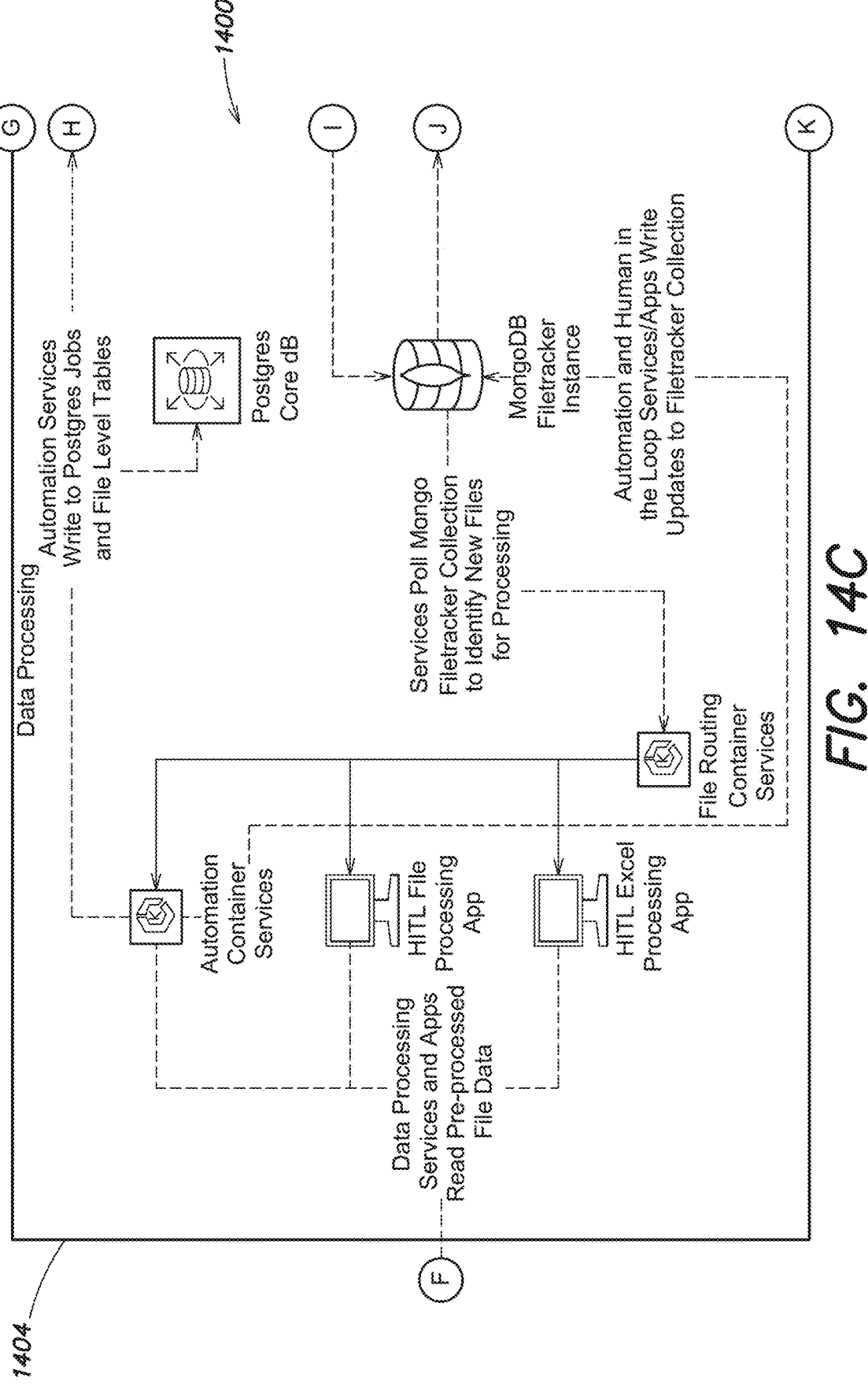
FIG. 14C shows a portion of an example pipeline flow for processing claims data, in combination with FIGS. 14A-B and D-F, according to various embodiments.
Figure 14D:
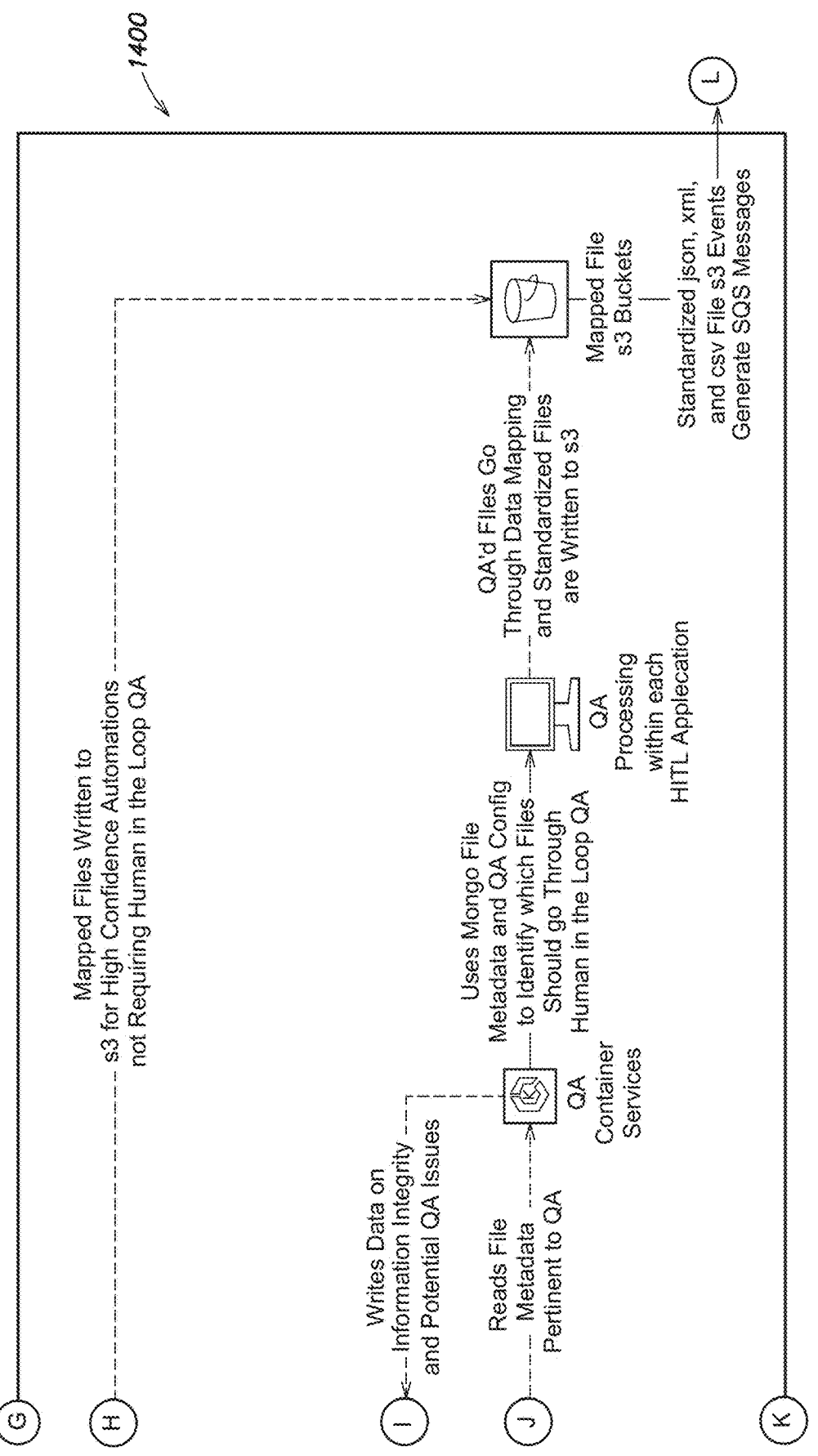
FIG. 14D shows a portion of an example pipeline flow for processing claims data, in combination with FIGS. 14A-C and E-F, according to various embodiments.
Figure 14E:
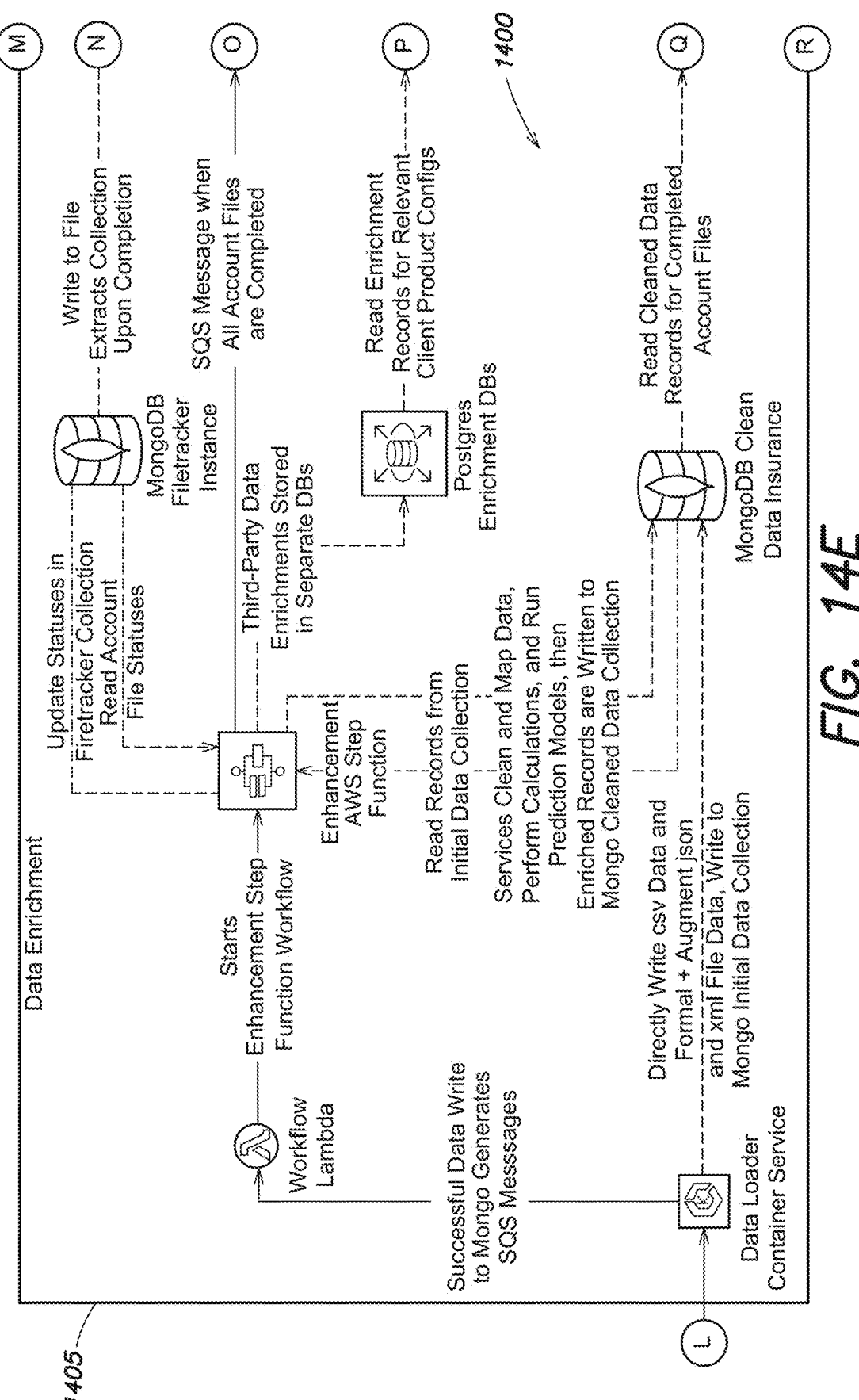
FIG. 14E shows a portion of an example pipeline flow for processing claims data, in combination with FIGS. 14A-D and F, according to various embodiments.
Figure 14F:
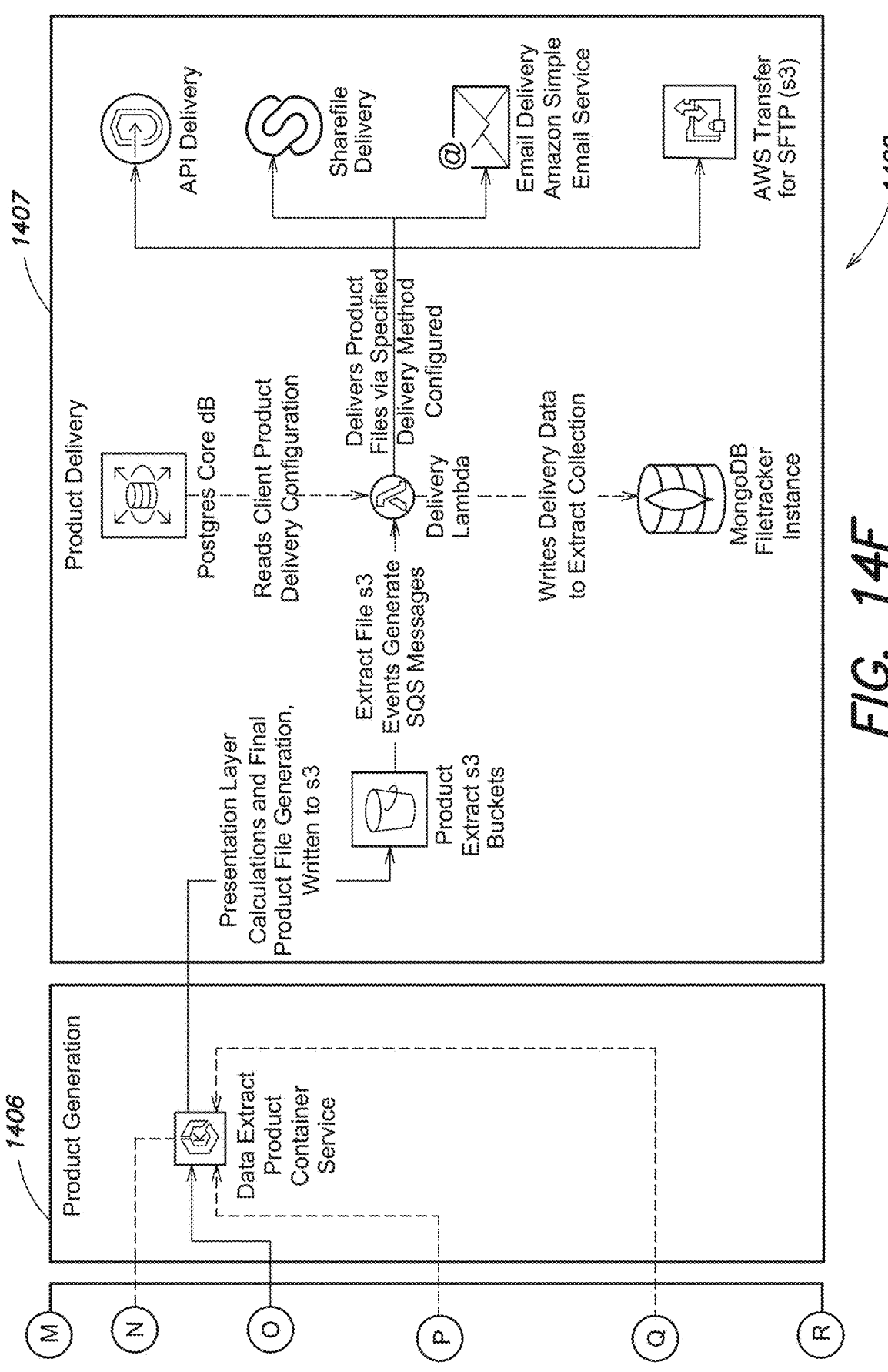
FIG. 14F shows a portion of an example pipeline flow for processing claims data, in combination with FIGS. 14A-E, according to various embodiments.

FIG. 13 shows an example process 1300 and subprocesses for producing deliverables to customer systems according to various embodiments. Process 1300 may be performed as a part of an extract pipeline, for example as discussed with relation to FIGS. 7A-B. For example, a postprocessing pipeline 1301 may produce system standard data 1302 (e.g., Groundspeed standard data) to a processing finalization procedure 1303. Procedure 1303 accepts work item settings 1304 from a customer configuration 1306 and data for extraction 1305 from standard data location (e.g., Groundspeed standard data 1307). Procedure 1303 produces a deliverable request to a deliverable generation procedure 1308 which sees extract settings 1309 from a configuration (e.g., Groundspeed configuration 1311) whereby a final deliverable 1310 is provided as customer deliverables 1312. Further, the final deliverable may be provided to a delivery system procedure 1313 which accepts delivery settings 1314 from a configuration (e.g., Groundspeed configuration 1316). The delivery system 1313 provides delivery records 1315 which may be stored within an extract database 1317. The customer work delivery 1318 may be delivered to one or more customer systems 1319.

In some examples, the final deliverable 1310 may be a document which contains information related to one or more particular claims input into the system. The final deliverable 1310 may have any suitable format, PDF, DOC, DOCX, TXT, CSV, PNG, JPEG, XLS, XLSX, XLC, JSON, and MSG among other text, document, message, image, and spreadsheet formats, among others. The final deliverable 1310 may include information extracted from a particular document or set of documents associated with the one or more claims, and one or more scores or estimates determined from the data extracted from the one or more claims (e.g., using machine learning models as described herein, such as with regard to FIG. 4), among other information. Examples of scores or estimates which may be included in the final deliverable 1310 may include a reserve score which indicates the magnitude of over or under reserving for a given open claim and a predicted total incurred which is the predicted total payout for a given open claim. Additional examples of information which may be included in a final deliverable 1310 may include a claim number or identifier for each particular claim input into the system, a line of business for each particular claim, a description for each particular claim, a location for each particular claim, a total paid for each particular claim, a total reserves for each particular claim, a total incurred losses for each particular claim, recoveries for each particular claim, and net uncured losses for each particular claim, among other information.

FIGS. 14A-14F show an example pipeline flow 1400 for processing claims data according to various embodiments. In particular, process 1400 includes one or more portions for ingesting, preprocessing, processing, enriching, generating, and delivering data product to one or more systems. As discussed above, data may be originated from any number of sources, systems, and datatypes.

As shown, an ingestion process 1401 feeds into operational services 1402, which connects to file preprocessing 1403, data processing 1404, data enrichment 1405, product generation 1406 and finally product delivery 1407. Ingestion process 1401 may involve ingestion of data through APIs, ingestion through files, emails, storage transfer or other ways of transferring data. Specific examples of ingestion processes may include Sharefile Ingestion, Amazon simple email service, and/or Secure File Transfer Protocol for AWS S3, among other ingestion processes. One or more processes, such as verification and routing container services, verification lambdas and routing lambdas may route data into different locations (e.g., buckets such as Orchestration S3 buckets and staging S3 buckets) and staged data using one or more workflows and processes. Ingestion process 1401 may include processes as discussed with relation to FIGS. 7A-B, 8A-B, and 10A-B. Such information may be routed and stored within particular databases according to one or more configurations such as those provided by operational services 1402. The configurations provided by operational services 1402 may include client ingestion configuration services and client product creation and configuration services.

File preprocessing 1403 may perform any number of analyses (e.g., scans for viruses) and route in separate particular files for processing. For example, images, Excel files, email messages, may be operated on, split, and routed and stored for later processing steps. Data preprocessing may additionally include prioritization of data, unzipping of specific data structures, metadata analysis, deduplication, and updating of data. File preprocessing 1403 may include processes as discussed with relation to FIGS. 7A-B, 8A-B, and 10A-B.

Data processing 1404 may receive the information and perform actual processing using data elements provided by the preprocessing step. During process 1404, one or more workflows may use this to review and process the documents and data of different types, some of which may involve HITL functions. For example, one or more quality assurance steps may be performed to determine whether particular data items should be corrected and/or verified. Based on the results of the quality assurance steps, one or more tasks may be generated which are to be performed on the data in response to identified potential quality assurance issues. Files requiring processing after identifying quality assurance issues may be sent to one or more human-in-the-loop applications for users to address identified issues. Data processing may additionally include determining one or more automated steps to be performed on data. After undergoing processing, data may be written to a standardized file type, for example a JSON, XML, or CSV file, among other file types as discussed herein. Data processing may include processes as discussed with relation to FIGS. 7A-B, 9A-C and 11.

In data enrichment process 1405, the system may perform one or more workflows data is mapped and augmented with information from third parties, prediction models, and other sources, and clean data is provided stored for product generation process 1406. Data enrichment process 1405 may include processes as discussed with relation to FIGS. 7A-B and 12. In product generation process 1406, data is extracted, formatted into a product or deliverable and provided to product delivery process 1407. In some examples, product delivery process 1407 provides information in the formats by which one or more systems and/or customers require the data, e.g., through API delivery, SFTPs, Sharefile delivery, email, Amazon simple email service, AWS transfer for SFTP (AWS S3) or other data delivery mechanism discussed herein. Product generation process 1406 and product delivery process 1407 may include processes as discussed with relation to FIGS. 7A-B and 13.

It should be appreciated that any of the above functionality may be used with other functions in any combination. Further, one or more aspects may be instantiated in one or more user interfaces, and some embodiments may relate to one or more computer-based interfaces for achieving the above-mentioned results.

CONCLUSION

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be understood that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be understood that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be understood that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system comprising:

at least one computer hardware processor; and at least one non-transitory computer readable storage medium, storing processor-executable instructions, that, when executed by the at least computer hardware processor causes the at least one computer hardware processor to perform a method comprising:

obtaining a plurality of input digital document entities including insurance claims data related to a subject insurance claim;

analyzing the plurality of input digital document entities to determine one or more workflows for processing at least one of the plurality of document entities;

processing the at least one of the plurality of document entities according to the one or more workflows, the processing comprising:

analyzing the at least one of the plurality of digital document entities to determine whether one or more human-in-the-loop tasks are to be performed on at least a portion of the at least one of the plurality of document entities; and when it is determined that one or more human-in-the-loop tasks are to be performed:

generating an interactive graphical user interface (GUI) including the one or more human-in-the-loop tasks to be performed for processing the portion of the at least one of the plurality of document entities;

displaying the interactive GUI;

obtaining, via the interactive GUI, digital document data corresponding to the portion of at least one of the plurality of document entities processed according to the one or more human-in-the-loop tasks; and updating the digital document entities based on the digital document data corresponding to the portion of the at least one of the plurality of document entities;

extracting a plurality of insurance claims features from the updated digital document entities;

analyzing the insurance claims data and insurance claims features using at least one machine learning model trained on a plurality of insurance loss claim records to predict a loss for the subject insurance claim;

generating a deliverable data product using the predicted loss, insurance claims data, and/or extracted insurance claims features; and providing the deliverable data product to one or more external systems.

2. The system according to claim 1, wherein at least one of the one or more human-in-the-loop tasks includes a quality assurance annotation performed by at least one user.

3. The system according to claim 1, wherein the at least one non-transitory computer readable storage medium stores further instructions that cause the processer to perform, before the analyzing, routing input documents or portions of input documents to one or more workflows.

4. The system according to claim 3, wherein the routing is performed based on a classification of the input documents or portions of input documents.

5. The system according to claim 3, the routing comprises routing the input documents or portions of input documents to a specific user to perform a reviewing action.

6. The system according to claim 3, wherein the routing comprises generating one or more tasks for processing the digital input document entities or portions of input document entities.

7. The system according to claim 6, wherein the one or more tasks comprise a plurality of parallel tasks to support processing of a single document entity.

8. The system according to claim 6, wherein generating the tasks is performed based on at least one of: quality metrics, random sampling, logical data check, and other properties of a subject input document or portion of the subject input document.

9. The system according to claim 1, the one or more human-in-the-loop tasks comprise annotating data elements of the at least one of the plurality of document entities.

10. The system according to claim 1, wherein the deliverable data product further comprises one or more of:

a risk measure in relation to a claim; and a scoring parameter in relation to the claim.

11. The system according to claim 1, wherein the at least one machine learning model is configured to predict loss in relation to the subject insurance claim based on closed claims data.

12. The system according to claim 1, wherein the at least one non-transitory computer readable storage medium stores further instructions that cause the processer to perform: analyzing the insurance claims data and insurance claims features using at least one machine learning model configured to predict loss in relation to the subject insurance claim based on open claims data.

13. The system according to claim 1, wherein the at least one machine learning model configured to predict loss in relation to a subject insurance claim is configured to train on a training data set defined across insurance carriers in a commercial insurance industry.

\* \* \* \* \*